United States Patent [19]
Sekine et al.

[11] Patent Number: 6,028,703
[45] Date of Patent: Feb. 22, 2000

[54] HIGH-EFFICIENCY POLARIZING ARRANGEMENT AND PROJECTION APPARATUS USING THE SAME

[75] Inventors: Atsushi Sekine, Saitama; Tetsuo Hattori, Kanagawa, both of Japan

[73] Assignee: Nikon Corporation, Tokyo, Japan

[21] Appl. No.: 09/041,734

[22] Filed: Mar. 13, 1998

[30] Foreign Application Priority Data

Mar. 14, 1997 [JP] Japan .................................... 9-082075
May 23, 1997 [JP] Japan .................................... 9-149991

[51] Int. Cl.$^7$ .................................................. G03B 21/14
[52] U.S. Cl. .......................... 359/487; 359/483; 362/19; 353/20
[58] Field of Search ................................ 362/19; 353/20; 349/9, 5, 96, 95; 359/483, 485, 494, 495

[56] References Cited

U.S. PATENT DOCUMENTS

| | | | |
|---|---|---|---|
| 5,387,953 | 2/1995 | Minoura et al. ...................... | 359/495 |
| 5,535,054 | 7/1996 | Shibuya .................................... | 359/495 |
| 5,757,547 | 5/1998 | Rodman et al. ........................ | 359/487 |
| 5,764,310 | 6/1998 | Yamagishi ................................ | 349/95 |
| 5,865,521 | 2/1999 | Hashizume et al. ...................... | 353/20 |

FOREIGN PATENT DOCUMENTS

| | | | |
|---|---|---|---|
| 0296391 | 4/1954 | Switzerland ............................ | 359/487 |
| 96/20422 | 7/1996 | WIPO . | |

*Primary Examiner*—Thong Nguyen
*Assistant Examiner*—John Juba, Jr.
*Attorney, Agent, or Firm*—Foley & Lardner

[57] ABSTRACT

In the present projection apparatus, R, G and B lights in the form of a S polarized light emitted from a fly-eye lens and a field lens are separated and the S polarized light is converted to a P polarized light so that it is illuminated onto a light valve. The S polarized light separated by the polarization beam splitter is illuminated onto the light valve converted to the P polarized light without being discarded, illuminance of the light onto the light valve is uniform and its polarization azimuth is arranged in the form of the P polarized light.

8 Claims, 19 Drawing Sheets

HIGH-EFFICIENCY POLARIZING ARRANGEMENT AND PROJECTION APPARATUS USING THE SAME

BACKGROUND OF THE INVENTION

1. Field of the Invention

The present invention relates to an illumination apparatus for allowing three color primary light components to be respectively incident onto liquid crystal light valves; and more particularly to a projection apparatus which modulates the incident beams of light by the liquid crystal light valves to perform a color synthesis for the modulated beams of light and projects the resulting chromatically combined light as a color projection image with a projection optical system.

2. Related Background Art

The projection apparatus has been known as an apparatus which decomposes a beam of light emitted from a light source into three primary components that are R light, G light and B light, respectively, a reflection type light valve is disposed for each color light, each of color lights incident onto corresponding one of the reflective type light valves is modulated either by a light color or by an electric signal for each color to be emitted, the emitted lights are chromatically combined with a color synthesis optical system to project a color projection image by a projection lens. A conventional projection apparatus is disclosed in International Publication W096/20422.

SUMMARY OF THE INVENTION

According to the projection apparatus of the present invention, the R, G and B lights of the s polarized light emitted from a fly-eye integrator and a field lens are decomposed by a polarization beam splitter to convert them to a P-polarized light. Therefore, the projection apparatus of the present invention is capable of irradiating the lights having a uniform illuminance and an equal polarization azimuth onto the light valve.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

A projection apparatus according to an embodiment of the present invention will be described hereinbelow. The same components and the components having the same function are denoted by the same reference symbols and descriptions for them are omitted.

(First Embodiment)

Figure 1:
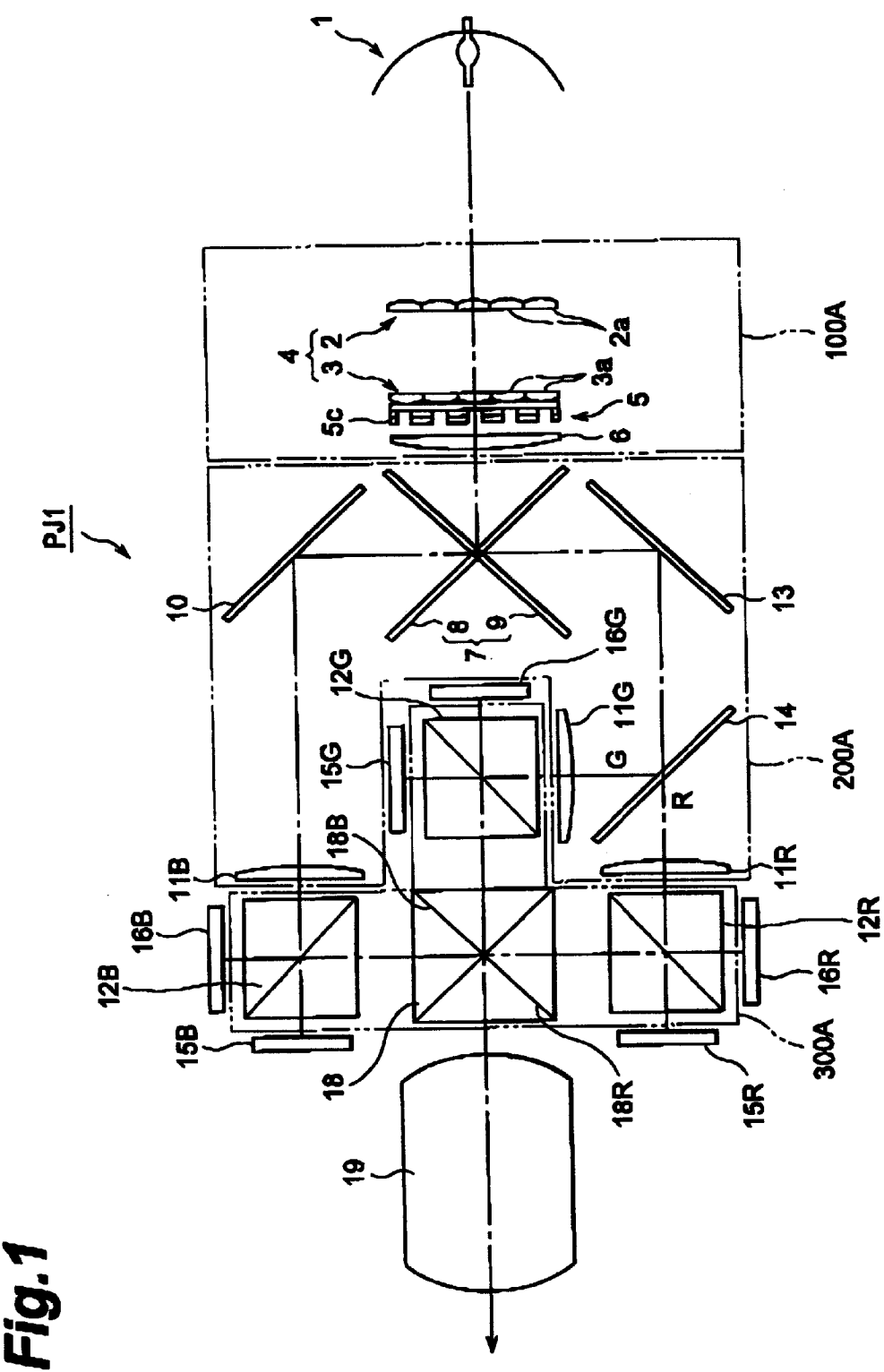
FIG. 1 is a schematic view showing a structure of a projection apparatus according to an embodiment of the present invention.

FIG. 1 is a diagram showing a structure of a projection apparatus PJ1 according to a first embodiment. A whole structure of the projection apparatus PJ1 will now be described.

The projection apparatus comprises:

(A) a light source 1 which emits a light having random polarization components;

(B) an illuminance unifying optical system 100A which converts an illumination light emitted from the light source 1 to a light exhibiting illuminance that is uniform on a plane perpendicular to an optical axis of the illumination light, thereby outputting it, and changes reflection and polarization azimuths of a returning light from an optical system at a next stage, thereby outputting it;

(C) reflection mirrors 16R, 16G and 16B which reflects specified polarization components of a light emitted from the illumination unifying optical system 100A and returns thereto;

(D) a color decomposition optical system 200A which decomposes the light emitted from the illuminance unifying system 100A into three primary color light components of a red color light (hereinafter, referred to as an R light), a green color light (hereinafter, referred to as a G light) and a blue color light (hereinafter, referred to as a B light) and allows the decomposed R, G and B lights to be incident onto liquid crystal light valves 15R, 15G and 15B, respectively;

(E) the liquid crystal light valves 15R, 15G and 15B which modulates polarization azimuths of the light incident thereto for pixels, thereby emitting them;

(F) an analyzing/color combining optical system 300A chromatically synthesizes on a single optical axis only the modulated components by the liquid crystal light valves 15R, 15G and 15B, among the color lights the polarization azimuth of which are modulated for the pixels; and (G) a projection optical system 19 which projects a light chromatically combined by the analyzing/color combining optical system 300A onto a screen and the like as a color projection image.

Next, structures of function components (A) to (G) of the projection apparatus PJ1 will be described. The light source 1 is composed of a lamp 1a such as a metal halide lamp and a concave mirror 1b such as an ellipsoidal mirror. A random polarization light is emitted from the light source 1. Arranged are a collimate lens (not shown) which converts the random polarization light from the light source 1 to an approximately parallel light, an infrared absorption filter (not shown) and an ultraviolet absorption filter (not shown) in this order. Therefore, the light emitted from the light source 1 is allowed to be incident onto the illuminance unifying optical system 100A as a parallel light having a random polarized light from which wavelength components in the infrared and ultraviolet regions are removed.

The illuminance unifying optical system 100A is composed of a first fly-eye lens (first lens plate) 2, a second fly-eye lens (second lens plate) 3, a partial reflection mirror member 5 having wave plates 5c thereon, and a field lens 6.

The reflection mirrors 16R, 16G and 16B are disposed close to the positions where characteristic polarized azimuth components (S polarized light) of the light emitted from the illuminance unifying optical system 100A are reflected to be restored to the optical system 100A, this light having P and S polarized components. The partial reflection mirror member 5 of the illuminance unifying optical system 100A has the wave plates 5c so that this returned light (S polarized light) is reflected by the partial reflection mirror member 5 and is subjected to the polarization azimuth conversion to a P polarized light, thereby emitting the light from the illuminance unifying optical system 100A. Moreover, the reflection mirrors 16R, 16G and 16B are disposed close to the respective exit planes of the polarization beam splitters 12R, 12G and 12B. The reflection mirrors 16R, 16G and 16B are arranged so that the normal lines to the splitters 16R, 16G and 16B are inclined with respect to the respective incidence optical axis of the S polarized light from the polarization beam splitters 12R, 12G and 12B. The illuminance unifying optical system 100A and the reflection mirrors 16R, 16G and 16B will be described later.

The color decomposition optical system 200A comprises (a) a cross dichroic mirror 7 disposed on an optical axis of the illuminance unifying optical system 100A and in front of the system 100A, the mirror 7 selectively reflecting the B light in a direction perpendicular to the optical axis of the light emitted from the illuminance unifying optical system 100A, reflecting the R light and the G light in a reverse direction to that of the reflected B light and having a R and G light reflection dichroic mirror 8 and a B light reflection dichroic mirror 9 which are disposed so that they intersect at right angles making an X shape;

(b) a bending mirror 10 which is disposed at a position where a traveling direction of the B light reflected by the cross dichroic mirror 7 is changed by 90 degrees;

(c) a field lens 11B which is disposed on an optical axis of the B light reflected by the bending mirror 10, the field lens 11B forming an image of the B light on the light valve 15B;

(d) a bending mirror 13 which is disposed at a position where traveling directions of the R and G lights reflected by the cross dichroic mirror 7 are changed by 90 degrees;

(e) a dichroic mirror 14 which selectively reflects the G light among the lights reflected the bending mirror 13 and transmits the R light;

(f) a field lens 11G which is disposed at a position so that an image of the G light reflected by the cross dichroic mirror 14 is formed on the light valve 15G; and (g) a field lens 11R which is disposed at a position so that an image of the R light passing through the cross dichroic mirror 14 is formed on the light valve 15R.

It should be noted that the illumination optical system for illuminating the liquid crystal light valves 15R, 15G and 15B consists of the optical components 1, 100A, 7, 10, 13, 14, 11R, 11G, 11B, 16R, 16G and 16B.

The liquid crystal light valves 15B, 15R and 15G modulate the polarized direction of the illumination light of the P polarized light incident thereto for each pixel using image signals of the light valves 15B, 15R and 15G and emit the modulated light. The modulated light is an S polarized light. Therefore, the modulated light (S polarized light) is mixed with an non-modulated light (P polarized light) and is emitted from the light valves 15B, 15R and 15G.

The analyzing/color combining optical system 300A serves to chromatically synthesize on the single optical axis only the components (S polarized light) the polarized direction of which is modulated by the liquid crystal light valves 15B, 15R and 15G.

The analyzing/color combining optical system 300A comprises:

(i) a polarization beam splitter 12B which is disposed between the field lens 11B and the light valve 15B, the beam splitter 12B transmitting the P polarized light and reflecting the S polarized light;

(ii) a polarized beam splitter 12G which is disposed between the field lens 11G and the light valve 15B, the polarized beam splitter transmitting the P polarized light and reflecting the S polarized light;

(iii) a polarized beam splitter 12R which is disposed between the field lens 11R and the light valve 15R, the beam splitter 12R transmitting the P polarized light and reflecting the S polarized light; and (iv) a cross dichroic prism 18 which has a B light reflection dichroic film 18B and an R light reflection dichroic film 18R intersecting each other, the prism 18 transmitting the G light in its traveling direction, which is reflected by the polarization beam splitter 12G, polarizing the B light, reflected by the polarization beam splitter 12B, in the traveling direction of the G light, and polarizing the R light, reflected by the polarization beam splitter 12R, in the traveling direction of the G light.

The projection optical system 19 consists of a projection lens 19 disposed in front of the cross dichroic prism 18 of the analyzing/color combining optical system 300A.

Next, a function of the projection apparatus PJ1 will be described. A random polarized light emitted from the light source 1 is incident onto the illuminance unifying optical system 100A and a light of uniform illuminance having a random polarized light is emitted from the illuminance unifying optical system 100A. The light emitted from the illuminance unifying optical system 100A is incident onto the cross dichroic mirror 7. The B light is reflected by the B light reflection dichroic mirror 8 of the cross dichroic mirror 7, and the reflected light travels to the direction perpendicular to the incident optical axis. This reflected light changes its traveling direction by 90 degrees by the bending mirror 10 to further travel to the B light field lens 11B. This light passing through the field lens 11B is incident onto the B light polarization beam splitter 12B as analyzing means.

On the other hand, the R and G mixed light reflected by the R and G light reflection dichroic mirror 9 changes its optical axis by 90 degrees by the bending mirror 13 and travels. The mixed light is incident onto the G light reflection dichroic mirror 14 disposed at an incidence angle of 45 degrees with respect to the optical axis. The mixed light is incident onto the mirror 14 and is decomposed into the R light traveling in the same direction as the incidence optical axis and the G light reflected in the direction perpendicular to the incidence optical axis. The R light and the G light pass through the field lenses 11R and 11G, respectively, and are incident onto the light polarization beam splitters 12R and 12G as analyzing means, respectively.

P polarized lights of colors incident onto the polarization beam splitters 12B, 12R and 12G pass through their polarization separation sections and are emitted therefrom. The emitted lights are incident onto the reflection type light valves 15B, 15R and 15G disposed close to the exit surfaces of the polarization beam splitters 12B, 12R and 12G, and illuminate the exit surfaces thereof.

S polarized light of colors incident onto the polarization beam splitters 12B, 12R and 12G are reflected in directions directed to the reflection mirrors 16B, 16R and 16G at the polarization separation sections of the splitters 12B, 12R and 12G. The reflected S polarized lights are again reflected to the polarization separation sections of the splitters 12B, 12R and 12G by the reflection mirrors 16B, 16R and 16G, and travel with angles slightly different from the incidence optical axis. The S polarized lights are reflected by the polarization beam splitters 12B, 12R and 12G while maintaining the S polarized state and travel back on the path to the polarization beam splitters 12B, 12R and 12G. The S polarized lights pass through the field lenses 11B, 11R and 11G for each of the colors and are again irradiated onto the illuminance unifying optical system 100A.

More specifically, the B light of the S polarized light reflected by the reflection mirror 16B is sequentially reflected by the polarization beam splitter 12B, the mirror 10 and the dichroic mirror 9, and is incident onto the field lens 6 so that the B light is incident onto the partial reflection mirror member 5. The R and G lights of the S polarized light reflected by the reflection mirrors 16R and 16G are subjected to a color synthesis by the dichroic mirror 14 and the light subjected to the color synthesis is reflected by the dichroic mirror 8 and travels to be incident onto the partial reflection mirror member 5.

The illuminance unifying optical system 100A comprises a reflection mirror layer 5b and a wave plate 5c as described later. The optical system 100A converts the polarized azimuth of the returned lights (R, G and B lights of the S polarized lights) to the P polarized light by the wave plate 5c and reflect the converted light to the direction of the cross dichroic mirror 7 by the reflection mirror layer 5b.

Therefore, the converted P polarized lights travel on the same path as that of the foregoing P polarized lights and are incident onto the polarization beam splitters 12B, 12R and 12G. The polarized lights transmit through their polarization separation sections and are emitted therefrom. The emitted lights are also incident onto the reflection type light valves 15B, 15R and 15G to illuminate them. Describing more specifically, the each of the color lights traveling after being converted from the S polarized light to the P polarized light are again decomposed into the R light and the G light by the dichroic mirrors 8 and 14 and the B light by the dichroic mirror 9, and the decomposed lights are incident onto the polarization beam splitters 12R, 12G and 12B for each of the colors through the field lenses 11R, 11G and 11B. Since the reflected color lights incident onto the polarization beam splitters 12R, 12G and 12B from the foregoing reflection mirror layer 5b are the P polarized light as described above, the reflected color lights transmit through the polarization separation sections of the polarization beam splitters 12R, 12G and 12B to be emitted therefrom. The reflected lights emitted from the splitters 12R, 12G and 12B are incident onto the light valves 15R, 15G and 15B for each of the colors to illuminate the light valves 15R, 15G and 15B.

Thereafter, the P polarized illumination lights incident onto the light valves 15B, 15R and 15G are modulated by the image signals of the light valves 15B, 15R and 15G. The modulated lights become the S polarized light and are emitted from the light valves 15B, 15R and 15G as a mixed light with the non-modulated light (P polarized light). The modulated lights are alone reflected by the polarization separation sections of the polarization beam splitters 12B, 12R and 12G for each of the colors and the non-modulated light is transmitted to be discarded, whereby the analyzing can be implemented.

Then, the analyzing lights that are reflected from the polarization beam splitters 12B, 12R and 12G and emitted therefrom are incident onto the cross dichroic prism 18 constituting the color synthesis optical system from different planes of incidence. In this prism 18, provided are a B light reflection dichroic film 18B and an R light reflection dichroic film 18R intersecting at right angles. The R light incident and the B light onto the prism 18 are respectively reflected in the same direction by the dichroic film 18R and the dichroic film 18B. The G lights transmit through both of the films 18R and 18B and travel also in the same direction. They are emitted as the projection light composed of the R, G and B lights and are incident onto the projection lens 19 as "the projection optical system". Thus, they are projected as a color image with a high luminance and a uniform illuminance on the screen (not shown).

Next, the foregoing illuminace unifying optical system 100A will be described more specifically. As described above, the illuminance unifying optical system 100A consists of (u) a first lens plate 2; (v) a second lens plate 3; (w) the partial reflection mirror member 5 having a wave plate 5c; and (x) a field lens 6.

Figure 2:
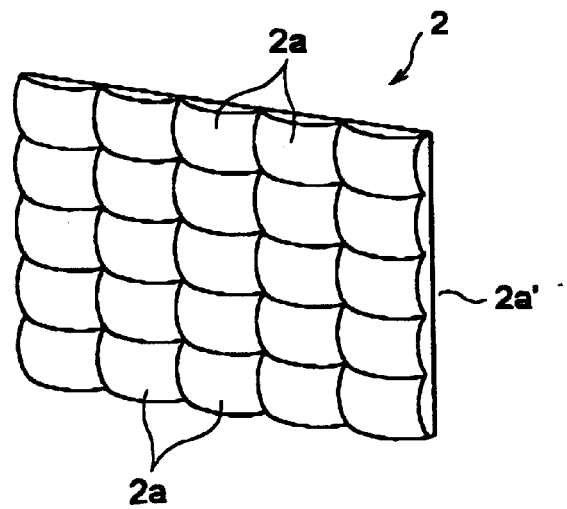
FIG. 2 is a perspective view of first and second lens plates used in the projection apparatus according to the embodiment of the present invention.

FIG. 2 is a perspective view of the first lens plate 2. On one surface of the first lens plate 2, arranged are micro lenses 2a of a convex shape consisting of 5×5 species, that is, 5 rows and 5 columns. The opposite surface 2a' to that where the lenses 2a are provided is a plane. Referring to FIG. 1 again, the first lens plate 2 is disposed so that the surface 2a' is positioned on the side of the second lens plate 3 and the convex plane 2a is positioned on the side of the light source 1.

The size of the second lens plate 3 is approximately the same as that of the first lens plate 2. The first and second lens plates 2 and 3 constitute a fly-eye integrator 4. The arrangement of the lens 3a composed of the convex lenses that are formed on the surface of the second lens plate 3 is the same as that of the first lens plate 2 and the lenses of 5×5 species, that is, 5 rows and 5 columns, are formed thereon. It should be noted that the lenses 2a and 3a of the first and second lens plates 2 and 3 are used for different purposes so that the lens 3a of the second lens plate 3 has a different shape from that of the lens 2a of the first lens plate 2.

More specifically, the light from the light source 1 is shaped to approximately parallel lights by a foregoing shaping optical system (not shown) and the parallel lights are incident onto the first lens plate 2. Each of the parallel lights is collected on corresponding one of the lens 3a on the second lens plate 3 by the apertures determined by the individual lens 2a on the first lens plate 2. In other words, the shape of the lens 2a on the first lens plate 2 is determined so that the lens 3a of the second lens plate 3 is disposed approximately at the focal point position of the lens 2a of the first lens plate 2. The position where the second lens plate 3 is to be disposed is determined. Moreover, the shape of the lens 3a of the second lens plate 3 is determined in order that the image of the light passing through the light point on the lens 2a of the first lens plate 2 is formed on the light valves 15R, 15G and 15B and the reflection mirrors 16R, 16G and 16B disposed at positions conjugated with the valves 15R, 15G and 15B after passing through the field lens 6 and the field lenses 11R, 11G and 11B shown in FIG. 1. The image formation of the light passing through the light point on the lens 2a is implemented by the lens 3a on the second lens plate 3 which corresponds to the light point.

Figure 3A:
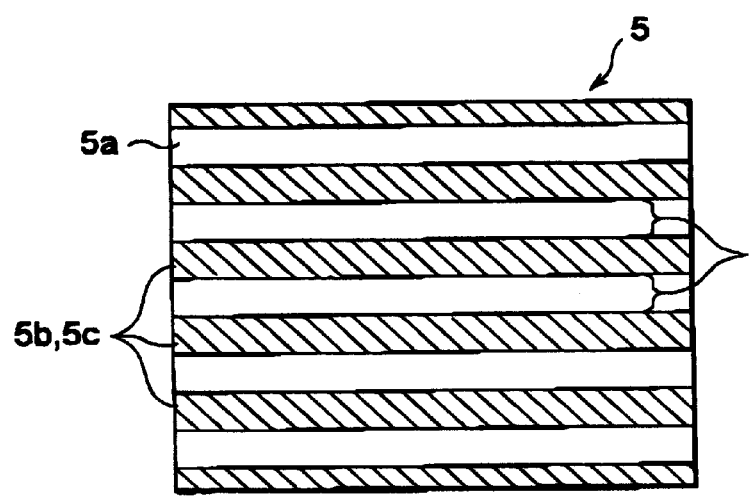
FIG. 3A is a front view showing a partial mirror member used in the projection apparatus according to the embodiment of the present invention.
Figure 3B:
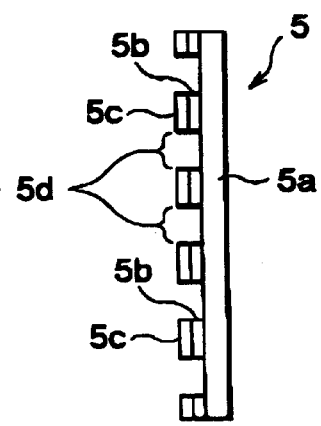
FIG. 3B is a right side view of the partial mirror member used in the projection apparatus according to the embodiment of the present invention.

FIGS. 3A and 3B are a plan view and a right side view of the partial reflection mirror member 5. The partial reflection mirror member 5 comprises a transparent glass plate 5a contacting with the convex surface side of the second lens plate 3; reflection mirror layers 5b, each being partially formed on the surface of the transparent glass plate 5a disposed on the side of the field lens 6; and 1/4 wave plates 5c formed on the reflection mirror layers 5b. The reflection mirror layers 5b are formed of a metallic material such as aluminum, and each of the layers 5b is formed to a ribbon shape. Each of portions 5d where the mirror layer is not formed transmits the light. After the returned light from the optical system in the next stage transmits through the 1/4 wave plate 5c, it is reflected by the reflection mirror layers 5b and transmits through the 1/4 wave plate 5c again. The S polarized returned light is converted to the P polarized light. More specifically, each of the 1/4 wave plates 5c is disposed so that its phase advance axis forms an angle of 45 degrees relative to the oscillation direction of the polarized light incident onto. When the linearly polarized light (S) once passes through the 1/4 wave plate 5c, it is converted to the circularly polarized light. When the circularly polarized light is reflected by the reflection mirror layer 5b and passes through the 1/4 wave plate 5c again, it is converted to the linearly polarized light (P) the oscillation direction of which is changed by 90 degrees. The foregoing partial reflection mirror member 5 is disposed close to the exit surface of the second lens plate 3. It should be noted that a 1/4 wave film is used as the 1/4 wave plate 5c.

The partial reflection mirror member 5 is disposed so that the center line of the reflection mirror layer 5b in the longitudinal direction substantially accords with the boundary between the lenses 3a on the second lens plate 3. It should be noted that the width of the reflection mirror layer 5b of the partial reflection mirror member 5 in this embodiment is determined so that the width of the layer 5b is approximately the same as that of the portion 5d where the mirror layer is not formed.

Referring to FIG. 1 again, the field lens 6 is disposed between the cross dichroic mirror 7 and the partial reflection mirror member 5.

Next, functions of the illuminance unifying light source 100A and the reflection mirrors 16R, 16G and 16B will be described. Specifically, referring to FIGS. 4, 5 and 6, image formation onto the liquid crystal light valve 15 using the illuminance unifying light source 100A, the reflection mirrors 16R, 16G and 16B and the field lens 11 will be described.

Figure 4:
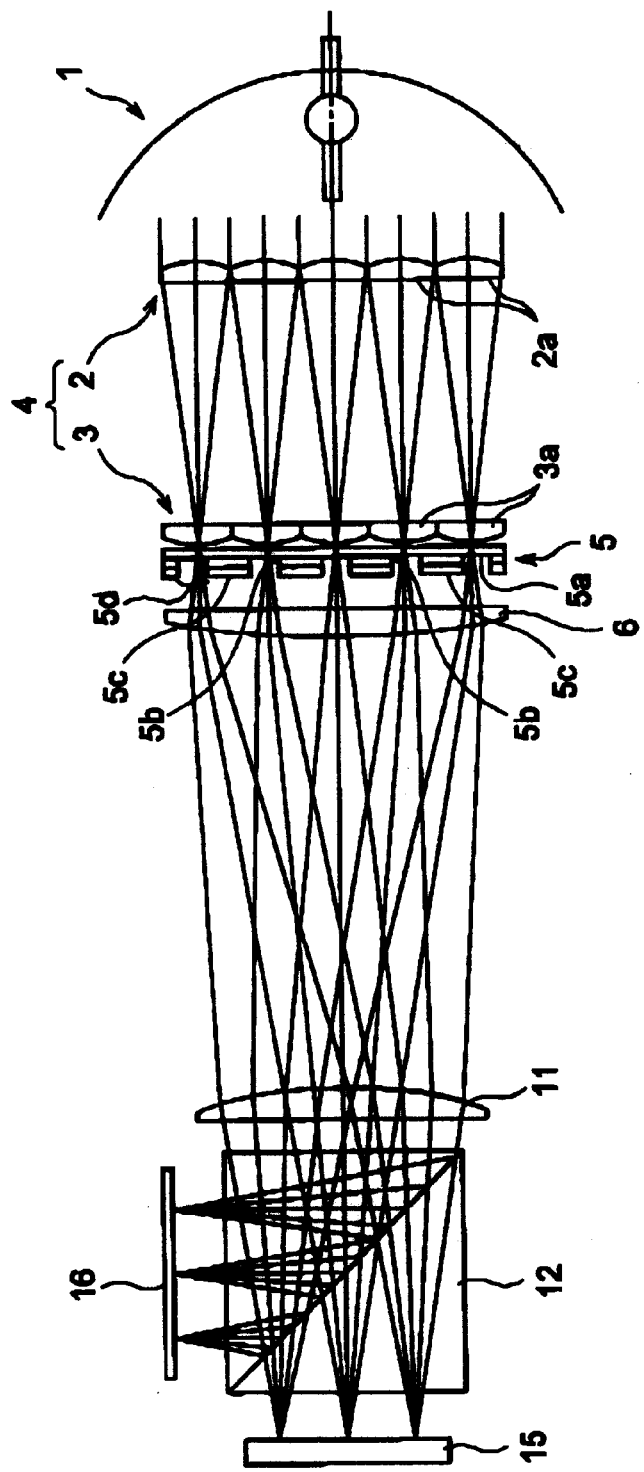
FIG. 4 is a diagram showing behaviors of two beams of light among the beams of light incident onto each of lens of a first lens plate which illuminate a light valve and a reflection mirror in an illumination optical system of the projection apparatus according to the embodiment of the present invention, one of the beam of light passing through a lens disposed at the center position among the lens of the first lens and the others passing through a lens disposed at the outermost position among the lens thereof.

FIG. 4 is a diagram showing the image formation onto the light valve 15 using the first and second lens plates 2 and 3, the field lenses 6 and 11. Concerning the beams of light shown in FIG. 4, the three beams of light are illustrate for each lens 2a. The two beams of light are incident onto the outermost portions of the aperture of the lens 2a on the first lens plate 2 and one beam of light is incident onto the center portion of the aperture of the lens 2a on the first lens plate 2. Although the illumination optical system should be illustrated for all of the R, G and B lights as a diagram of the illumination optical system, the optical path lengths of the three color lights are the same and the fundamental structures are also the same. Therefore, the three light valves 15B, 15R and 15G are illustrated by the light valve 15 as a representative and the polarization beam splitters 12B, 12R and 12G are illustrated by the polarization beam splitter 12. Moreover, the field lenses 11B, 11R and 11G are illustrated by the field lens 11 and the reflection mirrors 16R, 16G and 16B are illustrated by the reflection mirror 16. It should be noted that illustrations concerning the three color decomposition and synthesis optical systems and the bending mirror are omitted.

The light emitted from the light source 1 travels through the first and second lens plates 2 and 3 and the partial reflection mirror member 5, sequentially and is incident onto the field lens 6.

The lights are incident onto the aperture of each of the lenses 2a of the first lens plate 2. Among the P polarized light components of the lights, the beams of light which are incident in parallel with the optical axis and pass through the center portion of the aperture of the specified lens 2a of the first lens plate 2 pass through the center of the lens 3a of the second lens plate 3 corresponding to the aperture of the first lens plate 2. The beams of light transmit through the portion 5d of the partial reflection mirror member 5, where the mirror layer is not formed, and travel in parallel with the optical axis. That is, the beams of light travel while keeping its telecentric characteristic. The beams of light are collected to the almost central portion of the light valve 15 by the field lenses 6 and 11. Moreover, the S polarized light components which travel through the same path as that of the P polarized light components to the polarization beam splitter 12 are collected to the almost central portion of the reflection mirror 16.

As described above, the second lens plate 3 is disposed at the position of the focal length of the lens 2a of the first lens plate 2, so that the P polarized light components of the light incident onto the upper portion of the aperture of the lens 2a of the first lens plate 2 in parallel with the optical axis intersect the light passing through the center of the aperture of the lens 2a of the first lens plate 2, at the central portion of the lens 3a of the second lens plate 3. The P polarized light components transmit through the portion 5d of the partial reflection mirror member 5, where the mirror layer is not formed, and are collected to the lower portion of the light valve 15 by the field lenses 6 and 11. Moreover, the S polarized light components traveling through the same path as that of the P polarized light components to the polarization beam splitter 12 are collected to the right portion of the reflection mirror 16.

Since the second lens plate 3 is disposed at the position of the focal point position of the lens 2a of the first lens plate 2 as described above, the P polarized light components of the light incident onto the lower portion of the aperture of the lens 2a of the first lens plate 2 in parallel with the optical axis intersect the light passing through the center of the aperture of the lens 2a of the first lens plate 2, at the central portion of the lens 3a of the second lens plate 3. The P polarized light components transmit through the transparent portion that is the mirror layer un-formation portion 5d of the partial reflection mirror member 5 and are collected to the upper portion of the light valve 15 by the field lenses 6 and 11. Moreover, the S polarized light components traveling through the same path as that of the P polarized light components to the polarization beam splitter 12 are collected to the left portion of the reflection mirror 16.

Here, the illumination onto the light valve 15 by the P polarized lights which transmit through the polarization beam splitter 12 is implemented while maintaining the relation of the mirror image relative to the polarization separation section of the polarization beam splitter 12 of the illumination of the reflection mirror 16 by the reflection S polarized lights. This is because the light valve 15 and the reflection mirror 16 are disposed at the conjugated positions in the illumination optical system.

Next, the illumination of the light valve 15 by the light reflected by the reflection mirror 16 will be described.

Figure 5:
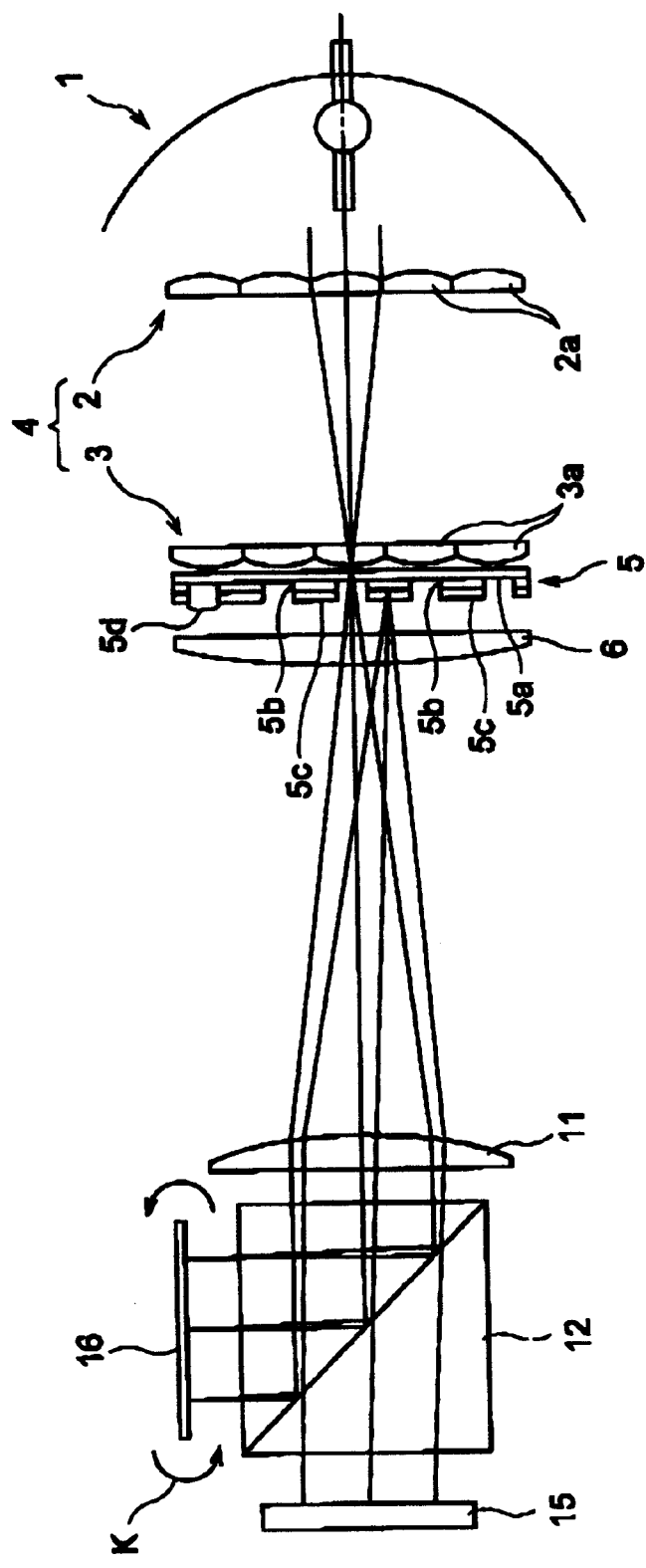
FIG. 5 is a diagram showing behaviors of the illuminations of the three beams of light incident onto lens disposed at the center of the first lens plate in the illumination optical system of the projection apparatus according to the embodiment of the present invention, the three beams of light illuminating the light valve after passing through the reflection mirror member and the partial reflection mirror member.

FIG. 5 is an explanatory view showing the incidence onto the reflection mirror 16 of the light which is incident onto the aperture at the central portion of the lens 2a of the first lens plate 2 and the illumination onto the light valve 15 of the reflected light by this reflection mirror 16.

In FIG. 5, the three lights are illustrated similar to FIG. 4. One light of the three lights is incident onto the central portion of the aperture of the lens 2a positioned at the center of the first lens plate 2 and the two lights are incident onto the outermost portions of the aperture of the lens 2a.

First, the S polarized light components of the light which is incident onto the center portion of the aperture of the lens 2a of the first lens plate 2 in parallel with the optical axis are incident onto the almost center portion of the reflection mirror 16 and reflected by the mirror 16, as described above. The reflection mirror 16 is in rotated state slightly in the direction of the arrow K in the diagram around the axis perpendicular to the paper plane of FIG. 5. Therefore, this incidence light reflected by the mirror 16 according to the reflection law is the S polarized light, so that this light is incident onto the polarization beam splitter 12 again. This incidence light is reflected by the polarization separation section of the polarization beam splitter 12 and travels with the optical axis little declined to the incidence optical axis. After transmitting through the field lens 6, this incidence light is made parallel to the optical axis by the field lenses 11 and 6 while keeping its telecentric character and is incident onto the reflection mirror layer 5b of the partial reflection mirror member 5 after passing through the 1/4 wave plate 5c.

The position of the reflection mirror layer 5b onto which the incidence light is incident is positioned below the lens 3a of the foregoing second lens plate 3 as shown in FIG. 5. The telecentric characteristic of the light incident onto the reflection mirror layer 5b is maintained and it is in a parallel direction to the optical axis so that this light is reflected in a completely opposite direction to the incidence direction and passes through the 1/4 wave plate 5c again, whereby this light is converted to the P polarized light and travels in the opposite direction with a small inclination to the optical axis. This light is incident onto the polarization beam splitter 12 and transmits through the polarization separation section of the polarization beam splitter 12. Finally, this light is incident onto the light valve 15.

The S polarized light components among the lights which are incident onto the upper portion of the aperture of the lens 2a of the first lens plate 2 intersect the light passing through the center portion of the aperture of the first lens plate 2 on the lens 3a of the second lens plate 3. The S polarized light components transmit through the mirror layer un-formed portion 5d of the partial reflection mirror member 5 and travel. The S polarized light components are incident onto the right portion of the reflected mirror 16 through the field lenses 6 and 11 and the polarization beam splitter 12. The reflected light reflected by this reflection mirror 16 travels with a small inclination to the incidence light and is incident onto the foregoing polarization beam splitter 12. The incidence light onto the splitter 12 is reflected by the polarization separation section. The reflected light passes through the field lenses 6 and 11 and is collected to the reflection mirror layer 5b of the partial reflection mirror member 5 with an angle relative to the optical axis at the same position as the light which is incident onto the center of the foregoing aperture. The reflected light by the reflection mirror layer 5b of the partial reflection mirror member 5 is reflected according to a reflection law and travels. The reflected light is converted to the P polarized light and incident onto the polarization beam splitter 12 after passing through the field lenses 6 and 11 so that the incidence light onto the splitter 12 is incident onto the light valve 15 with a small angle relative to the optical axis.

Moreover, the light which is incident to the lower portion of the aperture of the lens 2a of the first lens plate 2 intersects the light passing through the center of the aperture of the first lens plate 2 on the lens 3a of the second lens plate 3, and travels after passing through the mirror layer un-formed portion 5d of the partial reflection mirror member 5. This light is incident onto the left portion of the reflection mirror 16 through the field lenses 6 and 11 and the polarization beam splitter 12. The reflected light by the reflection mirror 16 travels with a small inclination to the incidence light and is incident onto the polarization beam splitter 12. This light is reflected by the polarization separation section and passes through the field lenses 11 and 6. Further, this light is collected to the reflection mirror layer 5b of the partial reflection mirror member 5 with an angle relative to the optical axis at the same position as the light incident onto the center of the foregoing aperture. The reflected light reflected by the reflection mirror layer 5b of the partial reflection mirror member 5b is reflected according to a reflection law and travels. This reflected light is converted to the P polarized light to pass through the field lenses 6 and 11, is incident onto the polarization beam splitter 12. The light is incident onto the lower portion of the light valve 15 while keeping a small angle relative to the optical axis.

Figure 6:
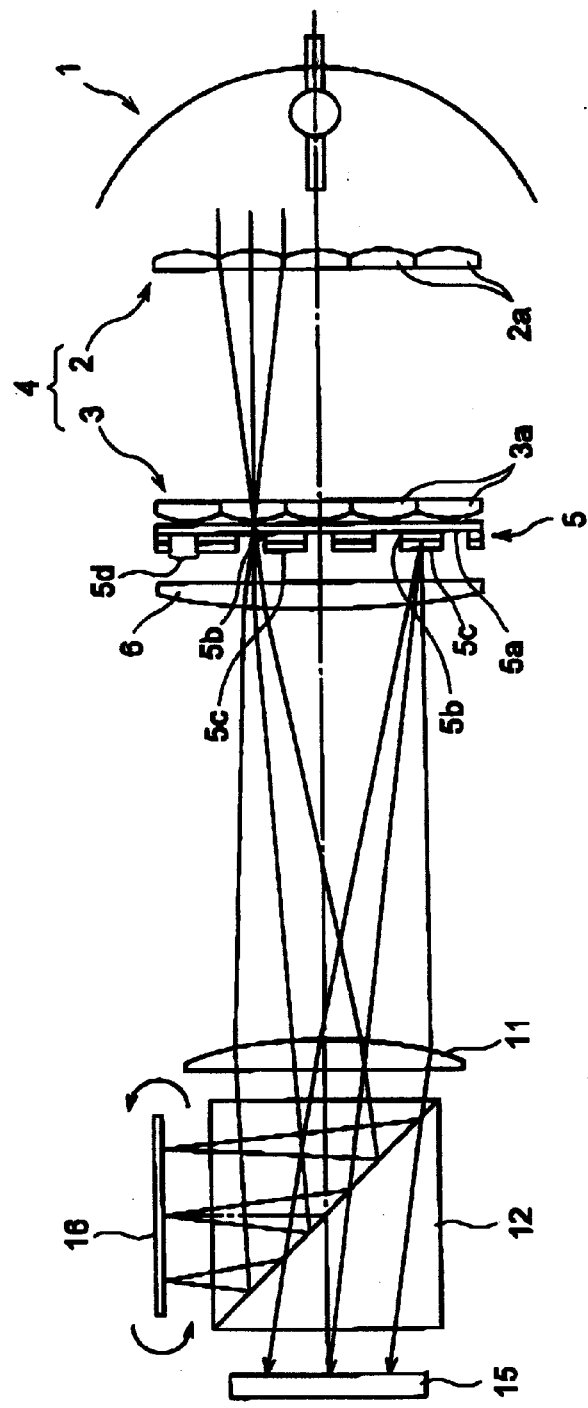
FIG. 6 is a diagram showing behaviors of the illuminations of the three beams of light incident onto lens disposed at the positions other than the center position of the first lens plate in the illumination optical system of the projection apparatus according to the embodiment of the present invention, the three beams of light illuminating the light valve after passing through the reflection mirror member and the partial reflection mirror member.

FIG. 6 shows three lights which are incident onto an aperture of the first lens plate 2 different from the foregoing aperture thereof. FIG. 6 shows the three lights which are incident onto the aperture adjacent to that at the center of the first lens plate 2 of FIG. 5, the aperture of FIG. 6 being disposed on the upper side of that of FIG. 5.

In the same manner as FIG. 5, the light which is incident onto the center of the aperture of the first lens plate 2 in parallel with the optical axis travels through the center of the lens 3a of the second lens plate 3 corresponding to that of the first lens plate 2 in parallel with the optical axis and is incident onto the almost center portion of the reflection mirror 16 through the field lenses 6 and 11 and the polarization beam splitter 12. The reflected light reflected by the reflected mirror 16 travels with a larger angle relative to the optical axis than that exhibited by the light in FIG. 5. This light is reflected by the polarization separation section of the polarization beam splitter 12 and converted to the a parallel light with the optical axis by the field lenses 11 and 6 while keeping a telecenetric characteristic. The parallel light is incident onto the reflection mirror layer 5b of the partial reflection mirror member 5 adjacent to that of the layer 5 through the 1/4 wave plate 5c, that mirror layer 5b being disposed under the adjacent mirror layer in FIG. 5.

The reflected light reflected by the reflection mirror layer 5b keeps its telecentric characteristic. Therefore, the reflected light travels in the opposite direction to that of the incidence light and is converted to the P polarized light. The converted light is incident onto the approximately central portion of the light valve 15 through the field lenses 6 and hand the polarization beam splitter 12 with a larger inclination to the optical axis compared to that shown in FIG. 5.

The light incident onto the upper portion of the aperture of the lens 2a of the first lens plate 2 intersects the light passing through the central portion of the aperture of the first lens plate 2 on the lens 3a of the second lens plate 3 and transmits through the mirror un-formed portion 5d of the partial reflection mirror member and travels. This light is incident onto the right portion of the reflection mirror 16 through the field lenses 6 and 11 and the polarization beam splitter 12 with an angle larger than the incidence angle of FIG. 5. The light reflected by the reflection mirror 16 travels with an angle larger than that of the incidence light relative to the optical axis in FIG. 5 and is incident onto the polarization beam splitter 12. This light is reflected by the polarization separation section and travels through the field lenses 11 and 6. This light is collected to the reflection mirror layer 5b of the partial reflection mirror member 5 with an angle relative to the optical axis at the same position as the light which is incident onto the central portion of the foregoing aperture. The reflected light by the reflection mirror layer 5b of the partial reflection mirror member 5 is reflected according to the reflection law and travels and is converted to the P polarized light. This light travels through the field lenses 6 and 11 and is incident onto the polarization beam splitter 12. This light is incident onto the upper portion of the light valve 15 with an angle relative to the optical axis.

Moreover, the light which is incident onto the lower portion of the aperture of the first lens plate 2 intersects the light passing through the central portion of the aperture of the first lens plate 2 on the lens 3a of the second lens plate 3. This light travels through the mirror layer un-formed portion 5d of the partial reflection mirror member 5 and is incident onto the left portion of the reflection mirror 16 with an incidence angle larger than that of FIG. 5, through the field lenses 6 and 11 and the polarization beam splitter 12. The reflected light by the reflection mirror 16 travels with an optical axis that is slightly inclined to the incidence optical axis, is incident onto the polarization beam splitter 12. This light is reflected by the polarization separation section and travels through the field lenses 11 and 6. This light is collected to the reflection mirror layer 5b of the partial reflection mirror member 5 while keeping an angle relative to the optical axis at the same position as the light which is incident onto the center portion of the aperture. The reflected light by the reflection mirror layer 5b of the partial reflection mirror member 5 travels after being reflected according to the reflection law, and is converted to the P polarized light. This light travels through the field lenses 6 and 11, and is incident onto the polarization beam splitter 12. This light is incident onto the lower portion of the light valve 15 with a small angle relative to the optical axis.

It should be noted that the light is illustrated, which passes through the right above the aperture disposed at the central portion of the first lens plate 2. Moreover, it can be understood that for the light incident onto the aperture disposed at the further upper position, the reflected light from the reflection mirror 16 is incident onto the reflection mirror layer 5b constructed right below the reflection mirror layer 5b of the partial reflection mirror member 5 shown in FIG. 6. Moreover, in case of the light incident onto the aperture disposed at the position lower than the central portion of the first lens plate 2, it can be understood by the similar consideration that the light is incident onto the reflection mirror layer 5b of the partial reflection mirror member 5 which is disposed at the position higher than the central portion of the partial reflection mirror.

As described above, when the reflection mirror 16 is inclined slightly, the S polarized light reflected by the polarization beam splitter 12 is reflected by this reflection mirror 16 and is reflected by the polarization separation section of the polarization beam splitter 12 again. The reflected light travels in the form of light which is inclined slightly to the incidence optical axis. This light is incident onto the reflection mirror layer 5b of the partial reflection mirror member 5 disposed close to the second lens plate 3, through the 1/4 wave plate 5c. Then, this light is reflected by the reflection mirror layer 5b and travels again in the opposite direction to the reflection mirror layer 5b to be converted to the P polarized light. The converted light can illustrate the light valve 15 after transmitting through the polarization separation section of the polarization beam splitter 12.

Specifically, the S polarized light which has been heretofore disused is converted to the P polarized light and is incident onto the light valve 15, whereby the S polarized light can contribute the illumination by the present invention. Thus, the S polarized light is superimposed on the P polarized light that is naturally a light from a light source incident onto the polarization beam splitter 12, the P polarized light transmitting through the polarization beam splitter 12 to illuminate the light valve 15, whereby the illumination with a high luminance can be achieved and a high luminance of the projection image can be obtained in spite of the use of the conventional light source 1. Moreover, in the present invention, the structure that uses the fly-eye integrator 4 using the first and second lens plates 2 and 3 is employed. Therefore, the light divided by the individual apertures of the lenses 2a of the first lens plate 2 is superimposed on the light valve 15 by the lens 2a of the second lens plate 2 so that a uniform illumination can be achieved.

(Second Embodiment)

Figure 7:
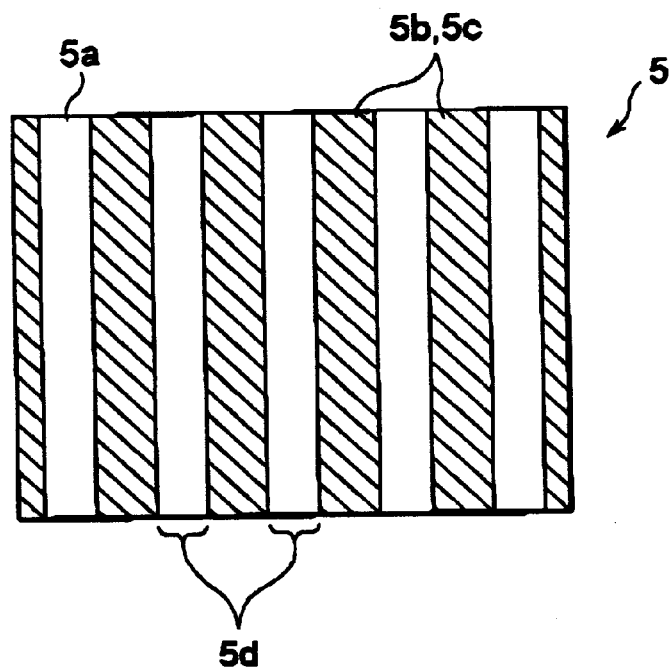
FIG. 7 is a front view of the partial reflection mirror member used in the projection apparatus according to the embodiment of the present invention.

FIG. 7 shows the partial reflection mirror member 5 used in the projection apparatus of the second embodiment. The projection apparatus of the second embodiment differs only in the mirror member 5 from the first embodiment.

The projection apparatus PJ1 of the second embodiment differs from that the first embodiment in that the reflection mirror layer 5b and the 1/4 wave plate 5c of the partial reflection mirror member 5 of the second embodiment show the longitudinal band shape, compared to the lateral band shape of the first embodiment.

This partial reflection mirror member 5 is disposed close to the second lens plate 3 similar to the projection apparatus of the first embodiment. It is necessary in this embodiment that the center of the band of the reflection mirror layer 5b of the partial reflection mirror member 5 is disposed close to the longitudinal line on the joint portion of each of the micro lenses 3a of the second lens plate 3. Such structure is employed for the following reasons. Specifically, in the structure of the projection apparatus of this embodiment, the incidence light collected to the central portion of the lens 3a of the second lens plate 3 should be transmitted through the mirror layer un-formed portion 5d of the partial reflection mirror member 5. On the contrary, the reduction in the quantity of the light to be illuminated to the light valve 15 produced by the reflection of the light source 1 to the direction of the light source 1 by the reflection mirror layer 5b of the partial reflection mirror member 5 can be prevented.

Concerning the structure of the illumination apparatus for use in the projection apparatus, in the first embodiment, the reflection mirror 16 onto which the S polarized light reflected by the polarization beam splitter 12 is incident is inclined by rotating it around the axis perpendicular to the paper plane. Contrary to this, in the structure of the second embodiment the reflection mirror 16 is rotated around the axis in parallel with the lateral direction of the paper plane.

(Third Embodiment)

Figure 8:
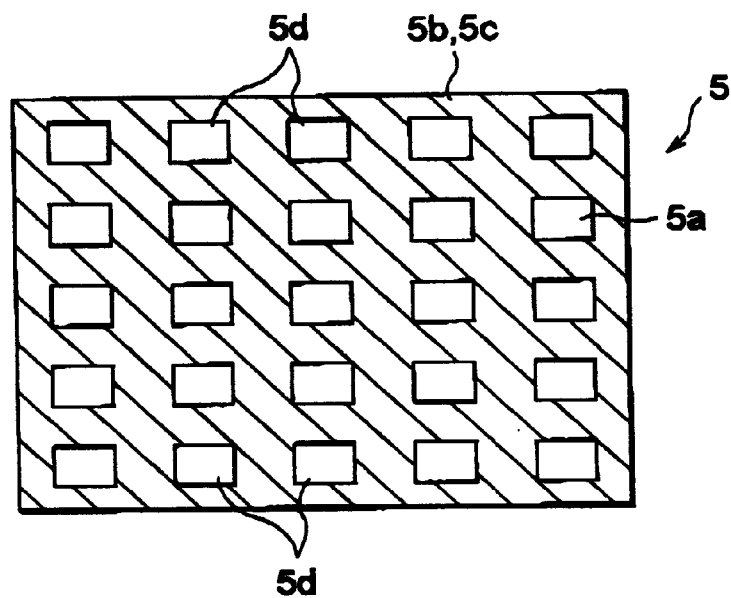
FIG. 8 is a front view of the partial reflection mirror member used in the projection apparatus according to the embodiment of the present invention.

FIG. 8 shows the partial reflection mirror member 5 used in the projection apparatus according to the third embodiment. The projection apparatus of this embodiment differs from the first embodiment only in the mirror member 5.

In the projection apparatus PJ1 of the first embodiment, the reflection mirror layer 5b and the 1/4 wave plate 5c of the partial reflection mirror member 5 show the lateral band shape. On the contrary, in the projection apparatus of the second embodiment, they show a lattice shape.

The partial reflection mirror member 5 is disposed close to the second lens plate 3, similar to the projection apparatus of the first embodiment. It is necessary that the lattice of the reflection mirror layer 5b should be disposed close to the lateral line and the longitudinal line on the joint portions of the lenses 3a of the second lens plate 3. Such structure is employed for the following reasons. Specifically, in the structure of the projection apparatus of this embodiment, the incidence light collected to the central portion of the lens 3a of the second lens plate 3 should be transmitted through the mirror layer un-formed portion 5d of the partial reflection mirror member 5. Moreover, the reduction in the quantity of the light onto the light valve 15, which is produced by the reflection of the light source 1 to the light source 1 by the reflection mirror layer 5b of the member 5, should be prevented.

Moreover, the reflection mirror 16 onto which the S polarized light reflected by the polarization beam splitter 12 is incident is inclined by rotating it around the axis perpendicular to the paper plane in the first embodiment. Contrary to this, in the structure of the third embodiment, the reflection mirror 16 is inclined to the axis in parallel with the axial direction perpendicular to the paper plane and as well as the lateral direction.

(Fourth Embodiment)

Figure 9:
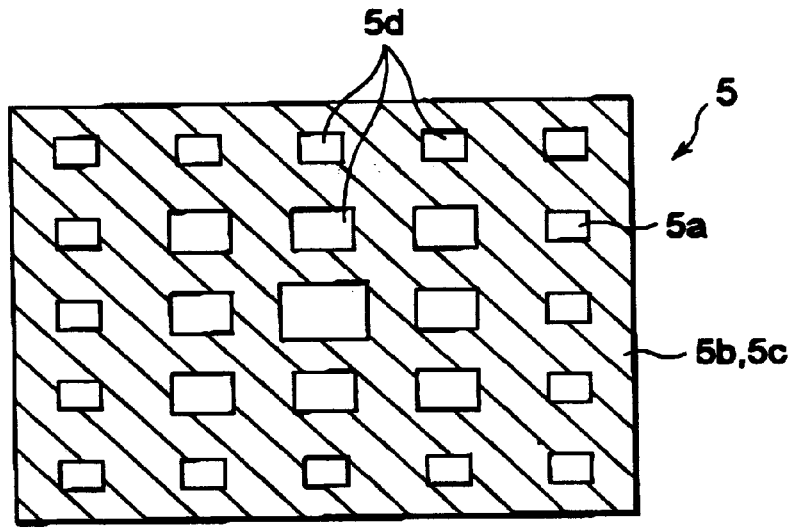
FIG. 9 is a front view of the partial reflection mirror member used in the projection apparatus according to the embodiment of the present invention.

FIG. 9 shows the partial reflection mirror member 5 used in the projection apparatus according to the fourth embodiment. This projection apparatus differs from that of the first embodiment only in the mirror member 5.

In the projection apparatus PJ1 of the first embodiment, the reflection mirror layer 5b and the 1/4 wave plate 5c of the partial reflection mirror member 5 show a lateral band shape. In the projection apparatus of the fourth embodiment, the reflection mirror layer 5b and the 1/4 wave plate 5c of the partial reflection mirror member 5 show a lattice shape. Furthermore, this mirror layer un-formed portion 5d shows the rectangular shape, in which the sides in the lateral direction is longer than those in the longitudinal direction. This mirror layer un-formed portion 5d of the rectangular shape disposed at the center of the partial reflection mirror member 5 is larger than those disposed at other places of the member 5, and the portions 5d become smaller as they are closer to the periphery of the partial reflection mirror member 5. As a matter of course, the areas of the reflection mirror layer 5b and the 1/4 wave plate 5c disposed at the center of the member 5 are smaller at the center of the member 5 and larger at the periphery of the member 5.

The approximately parallel light from the light source 1 shown in FIG. 1 is incident onto the aperture determined by the micro lens 2a of the first lens plate 2. The light incident onto this aperture is converged to the micro lens 3a of the second lens plate 3 which corresponds to the lens 2a. If a light source portion of a lamp of the light source 1 is an ideal point light source, the light is just converged to a point. On the contrary, the light source 1 using an actual lamp has a some size and the shape of the bright point of the light which is collected to the micro lens 3a of the second lens plate 3 is large. However, it is small in the periphery.

Therefore, the sizes of the mirror layer un-formed portion 5d and the reflection mirror layer 5b are changed depending on the shape of the bright point, whereby the light reflected from the reflection mirror 16 can be further effectively reflected by the reflection mirror layer 5b. Thus, the light valve 15 can be more effectively illuminated.

(Fifth Embodiment)

Figure 10:
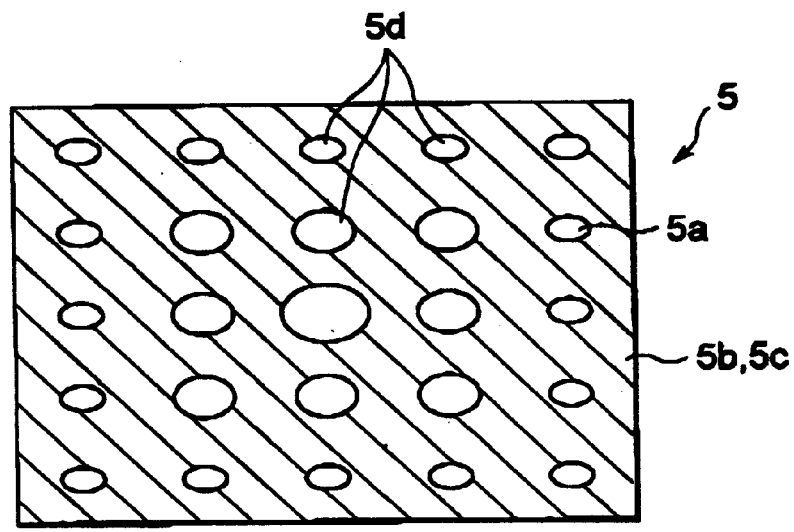
FIG. 10 is a front view of the partial reflection mirror member used in the projection apparatus according to the embodiment of the present invention.

FIG. 10 shows the partial reflection mirror member 5 used in the projection apparatus according to the fifth embodiment. The projection apparatus of this embodiment differs from that of the first embodiment only in the mirror member 5.

In the projection apparatus PJ1 of the first embodiment, the shapes of the reflection mirror layer 5b and the 1/4 wave plate 5c of the partial reflection mirror member 5 show a lateral band shape. Each of the mirror layer un-formed portion 5d shows an ellipsoidal shape extending in the lateral direction. In addition, the mirror layer un-formed portion 5d of the ellipsoidal shape disposed in the central place of the partial reflection mirror member 5 is large and the portion 5d is smaller as its position disposed becomes closer to the periphery of the member 5. As a matter of course, the areas of the reflection mirror layer 5b and the 1/4 wave plate 5c disposed at the center of the member 5 are smaller at the center of the member 5 and larger at the periphery of the member 5.

As described above, by forming the mirror layer un-formed portion 5d to be the ellipsoidal shape, it is possible to close to the shape of the portion 5d to the shape of the bright point, whereby the light valve 15 can be illuminated more effectively.

(Sixth Embodiment)

Figure 11:
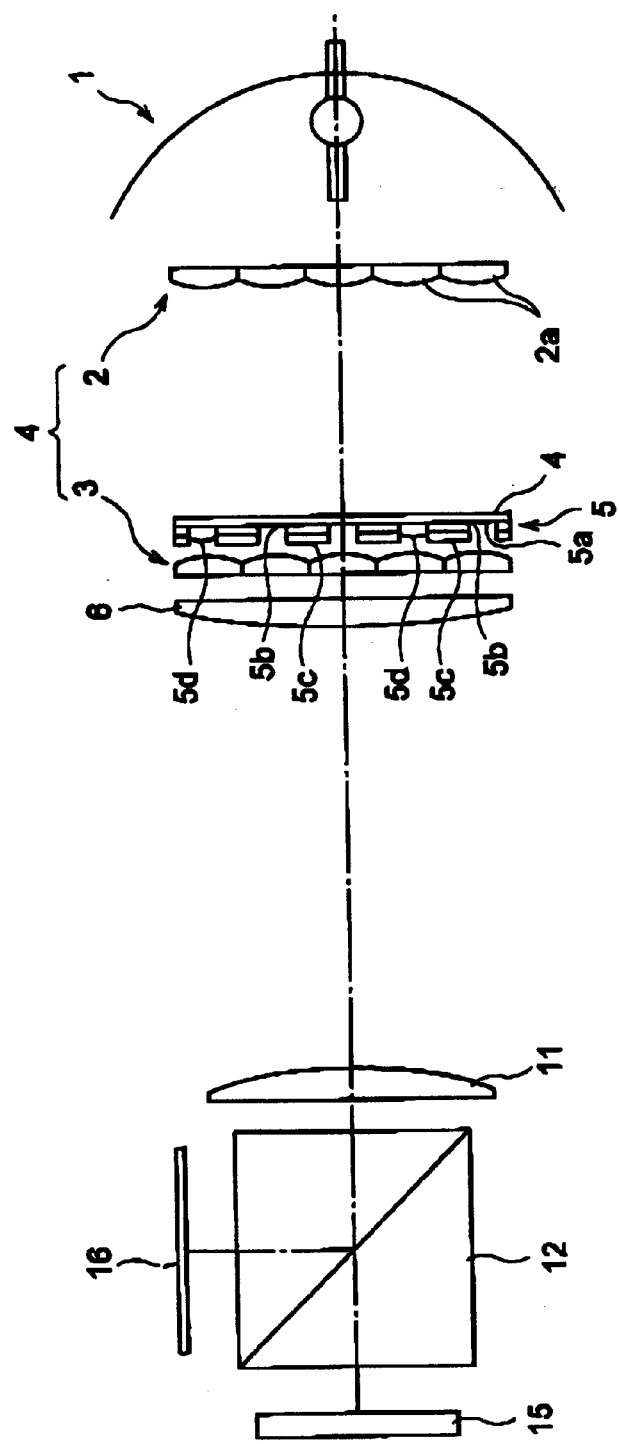
FIG. 11 is a schematic view showing an illumination optical system for the light valve of the projection apparatus according to the embodiment of the present invention.

FIG. 11 shows a principal portion of the projection apparatus according to the sixth embodiment. This projection apparatus of the sixth embodiment differs from those of the first to fifth embodiments only in the arrangement of the partial reflection mirror member 5.

In the foregoing embodiments, the partial reflection mirror member 5 is disposed close to the transmission direction of the second lens plate 3 when viewed from the side of the light source 1, that is, the member 5 is disposed on the left side of the second lens plate 3 as shown in the drawings. In this sixth embodiment, the partial reflection mirror member 5 is disposed at the position close to the surface of the second lens plate 3 which faces the side of the first lens plate 2.

In this case, in order to dispose the partial reflection mirror member 5 closer to the lens 3a of the second lens plate 3 as possible and to bring the collection point of the light on the lens 3a of the second lens plate 3 which is collected by the lens 2a of the first lens plate 2 close to that of the reflection light from the reflection mirror 16, the projection apparatus of this embodiment should be preferably designed such that the surface of the second lens plate 3 where the lens 3a is formed is disposed on the side of the first lens plate 2, that is, on the size of the partial reflection mirror member 5.

(Seventh Embodiment)

Figure 12:
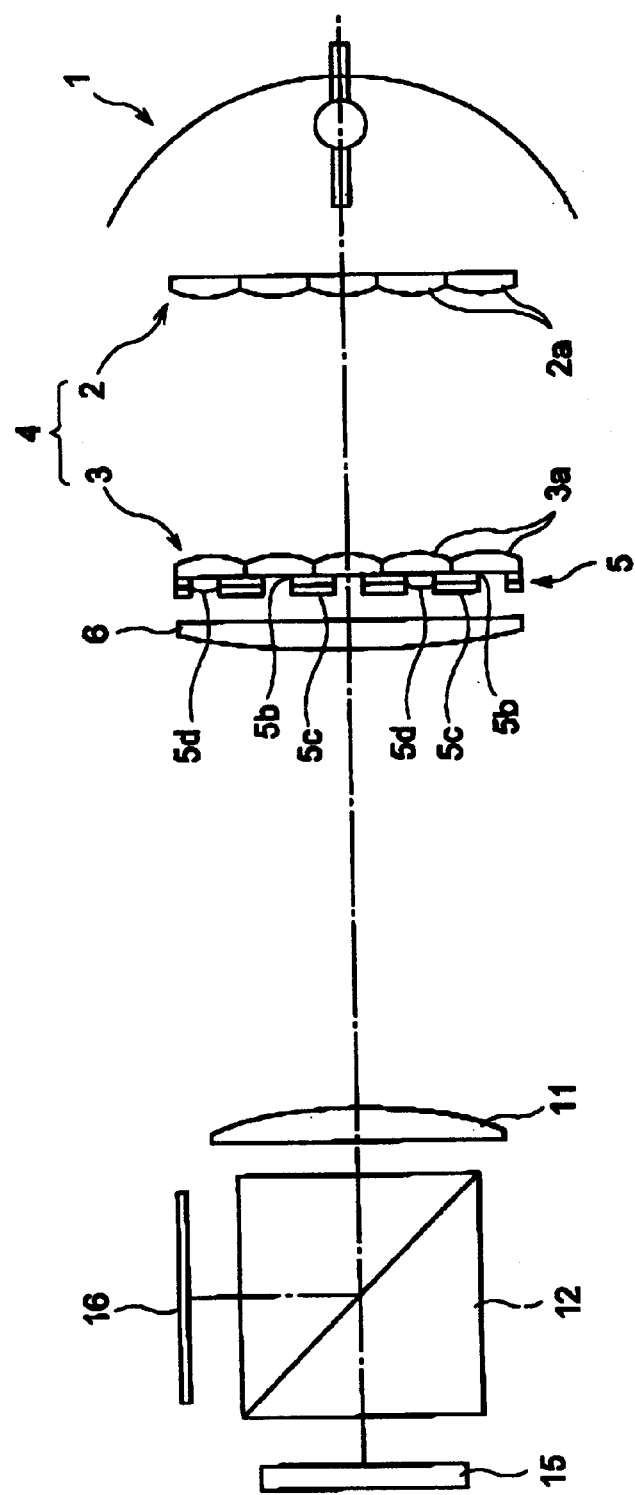
FIG. 12 is a schematic view showing an illumination optical system for the light valve of the projection apparatus according to the embodiment of the present invention.

FIG. 12 shows the projection apparatus according to the seventh embodiment. In the first to sixth embodiments, the partial reflection mirror member 5 is independently provided, which has a function to collect the reflection light from the reflection mirror 16 in order to reflect the light again. In this seventh embodiment, the component equivalent to the partial reflection mirror member 5 is formed in the second lens plate 3.

Figure 13:
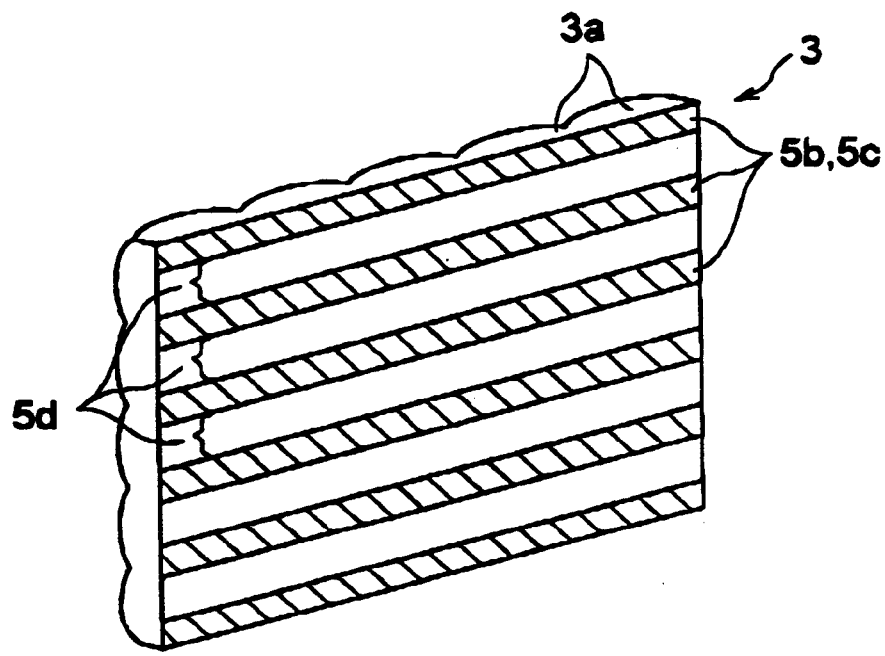
FIG. 13 is a perspective view showing of the second lens plate of the projection apparatus according to the embodiment of the present invention, in which a reflection mirror layer is provided.

FIG. 13 is a perspective view of the second lens plate 3 used in the projection apparatus according to the seventh embodiment. As shown in FIG. 13, the reflection mirror layer 5b and the 1/4 wave plate 5c having a lateral band shape are formed on the plane portion of the second lens plate 3 opposite to the surface where the lenses 3a are formed and at the position corresponding to the boundary of the lenses 3a.

The light source light emitted from the light source 1 is incident onto the lens 3a of the second lens plate 3 through the lens 2a of the first lens plate 2 in the form of approximately a parallel light, the second lens plate 2 being disposed at the position of the focal distance of the lens 2a. This light in parallel with the optical axis, which passes through the mirror layer un-formed portion 5d and the field lenses 6 and 11, is reflected by the polarization separation section of the polarization beam splitter 12 and incident onto the reflection mirror 16. This incidence light onto the mirror 16 is reflected by the reflection mirror 16. Moreover, this light is incident onto the polarization beam splitter 12 again to be reflected by the polarization separation section. Further, the light is emitted therefrom to travel through the field lenses 11 and 6. The light is made in parallel with the optical axis, (i.e., keeping its telecentric characteristic), and is incident onto the reflection mirror layer 5b of the second lens plate 3. This light reflected from the reflection mirror layer 5b keeps its telecentric characteristic until it reaches the field lens 6. In other words, the light travels in the opposite direction to that of the incidence light and is incident onto the polarization beam splitter 12 again. The light passes through the polarization beam splitter 12 to illuminate the light valve 15.

With such structure of the projection apparatus of this embodiment, the S polarized light reflected by the polarization beam splitter 12 is converted to the P polarized light, the S polarized light being heretofore discarded, and transmits through the polarization beam splitter 12, whereby the light valve 15 can be illuminated and the quantity of the light illuminating the light valve 15 can be significantly increased. Therefore, a significant effect that is capable of obtaining a high luminance image as the projection image can be provided, in spite of the use of the same light source 1.

As this embodiment, if the reflection mirror layer 5b and the 1/4 wave plate 5c are formed in the second lens plate 3, it is unnecessary to provide another partial reflection mirror member 5 that is required in the second embodiment. Thus, it is possible to reduce the number of components of the projection apparatus.

The shapes of the reflection mirror layer 5b and the 1/4 wave plate 5c may be a longitudinal band as shown in FIG. 7. They may be disposed in a lattice fashion. The areas of them may be changed as the position of them goes toward the outside of the partial reflection mirror member as shown in FIGS. 9 and 10. As a matter of course, the shapes of them are determined depending on the inclination direction of the reflection mirror 16.

Moreover, in the embodiments of the present invention, the transmission light is first incident onto the light valve, among the lights produced by the three color decomposition optical system, each light being onto corresponding one of the polarization beam splitters which constitute the projection apparatus. The reflected polarized light is introduced to the reflection mirror according to the present invention to be reflected. As a matter of course, the structure may be adopted, in which each of the lights reflected by corresponding one of the polarization beam splitters is first incident onto the light valve and the reflection mirror is disposed at the position where the light transmits therethrough.

After the 1/4 wave plates 5c provided on the reflection mirror layer 5b may be formed by cutting a 1/4 wave film to the same shape, they may be adhered to the reflection mirror layer 5b of a predetermined shape. However, the 1/4 wave plate layer 5c may be formed by a slant evaporation method. In this case, the reflection mirror layer 5b may be formed in such manner that aluminum or the like is formed to a predetermined shape by a mask evaporation, and titanium dioxide ($TiO_2$) layer or the like is formed thereon to a predetermined thickness by an evaporation method. As long as the evaporation mask is prepared, the 1/4 wave plate 5c can be formed on the reflection mirror layer with a high precision in spite of its ellipsoidal shape. Even in the case of the present invention, it is needless to say that the phase advance axis as the 1/4 wave plate can be manufactured in a predetermined direction when the inclination direction of the substrate during formation of the film is controlled.

(Eighth Embodiment)

Figure 14:
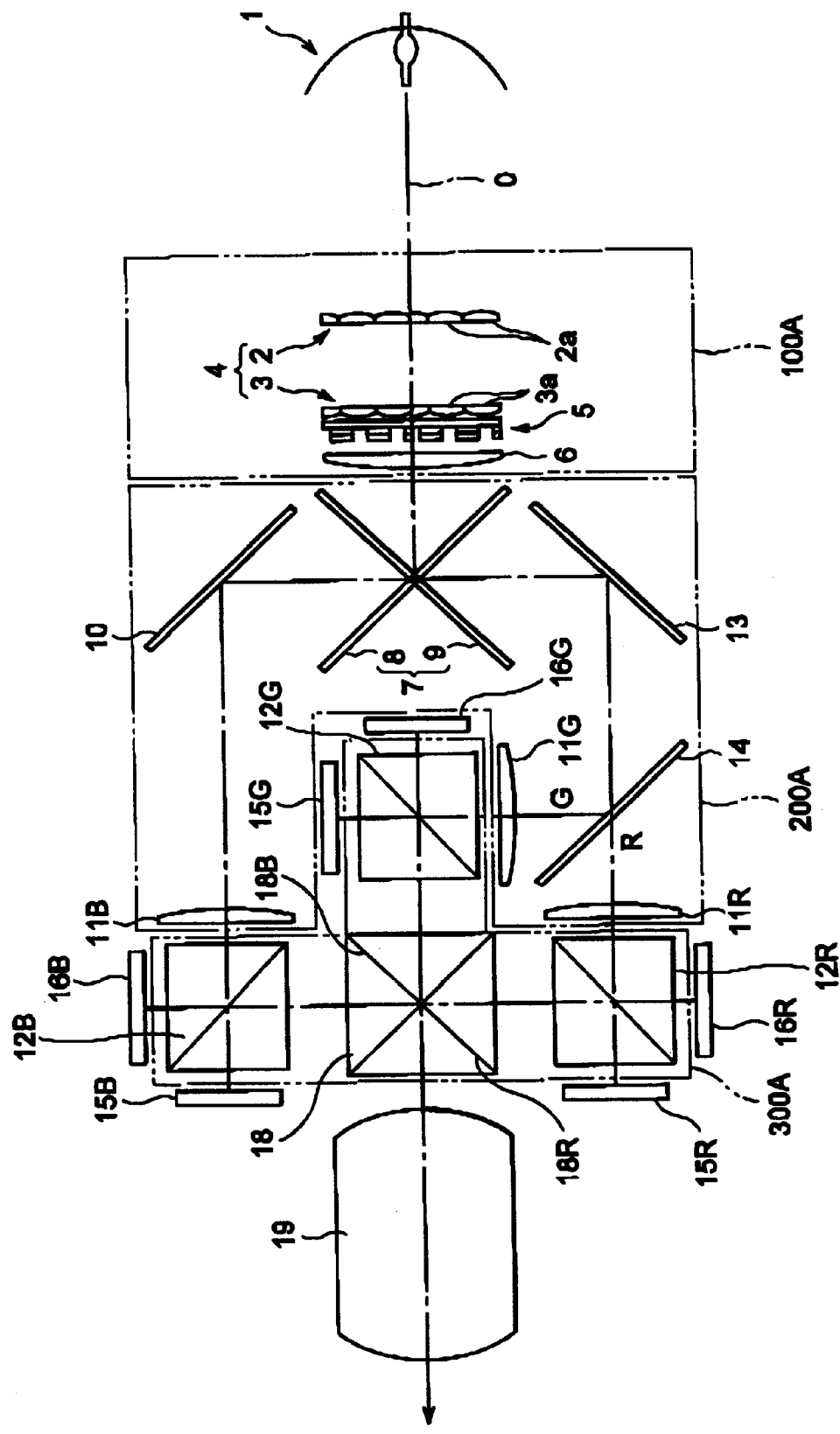
FIG. 14 is a schematic view showing a structure of the projection apparatus according to the embodiment of the present invention.

FIG. 14 shows a projection apparatus according to the eighth embodiment. The projection apparatus of this embodiment comprises a light source 1; an illuminance unifying optical system 100A; reflection mirrors 16R, 16G and 16B; a color decomposition optical system 200A; liquid crystal light valves 15R, 15G and 15B; a analyzing/color combining optical system 300A; and a projection optical system 19. Compared to the projection apparatus of the first embodiment, the projection apparatus of this embodiment differs only in the constitution of the illuminance unifying optical system 100A.

Figure 15:
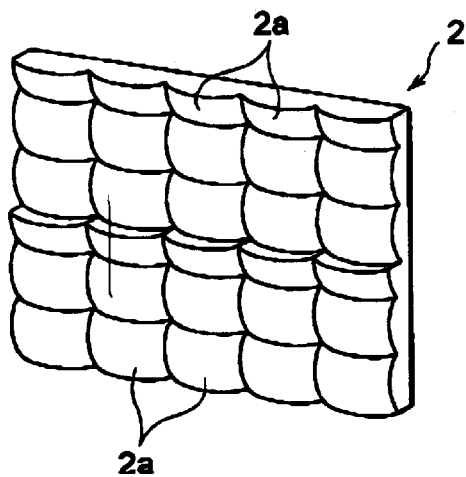
FIG. 15 is a perspective view of the first lens plate used in the projection apparatus according to the embodiment of the present invention.

FIG. 15 shows a principal part of the illumination optical system onto the light valve of the projection apparatus of this embodiment. Although descriptions for all of the R light, G light and B light should be made originally, three lights have the same optical path length and the same fundamental structure. Three light valves 15R, 15G and 15B are represented by the light valve 15; the polarization beam splitters 12R, 12G and 12B, the polarization beam splitter 12; the field lenses 11R, 11G and 11B, the field lens 11; and the reflection mirrors 16R, 16G and 16B, the reflection mirror 16. Here, illustrations for the three color decomposition synthesis optical system and the bending mirror are omitted.

The illumination optical system 100A comprises a first lens plate 2, a second lens plate 3, a partial reflection member 5 and a field lens 6, which are sequentially arranged in this order from the side of the light source 1. The partial reflection mirror member 5 is constructed such that a plurality of reflection mirror layers 5b having a lateral band shape are partially formed on the transparent glass plate 5a, the 1/4 wave plate layer 5c is formed on each reflection mirror layer 5b, and a space between the bands is used as the mirror layer un-formed portion 5d transmitting the light. The random polarized light is incident onto the field lens 6 through the mirror layer un-formed portion 5d.

FIG. 15 is a perspective view showing the shape of the first lens plate 2. As shown in FIG. 15, on the surface of the first lens plate 2, a plurality of lenses 2a of a convex shape are provided, in which the lenses 2a of 6×5 species, that is, 6 rows and 5 columns, are arranged in the lateral and longitudinal directions. The surface where the lenses 2a are formed and the other surface opposite to that surface are plane.

It should be noted that the lenses 2a disposed in the uppermost first row and the fourth row are formed to a shape obtained by cutting their upper-half portion. The sizes of these lenses 2a are half those of other lenses 2a.

The shape of the second lens plate 3 is almost the same as that of the first lens plate 2. An arrangement of the lenses 3a formed on the surface thereof is the same as that of the first lens plate 2, that is, the lenses 3a of 6×5 species, that is, 6 rows and 5 columns, are arranged in the lateral and longitudinal directions. It should be noted that the shape of the lenses 2a of the first lens plate 2 differs from that of the lenses 3a of the second lens plate 3. As described below, this is because the purpose of the lenses 2a of the first lens plate 2 differs from that of the lenses 3a of the second lens plate 3.

The projection apparatus of this embodiment is constructed such that the light source light from the light source 1 is incident onto the first lens plate 2 after being shaped to approximately the parallel lights by the shaping optical system (not shown) and each of the parallel lights is collected by the aperture determined individually by the lens 2a of the first lens plate 2 onto the lens 3a of the second lens plate 3 corresponding to the lens 2a of the first lens plate 2. Specifically, the shape of the lens 2a of the first lens plate 2 and the position of the second lens plate 3 are determined in order that the lens 3a of the second lens plate 3 is disposed approximately at the focal point position of the lens 2a of the first lens plate 2. Moreover, the shape of the lens 3a of the second lens plate 3 is determined in order that the light point on the lens 2a of the first lens plate 2 passes through the field lenses 6 and 11 and the image of this light point is formed on the light valve 15 and the reflection mirror 16 disposed at the conjugated position to the light valve 15.

Figure 16A:
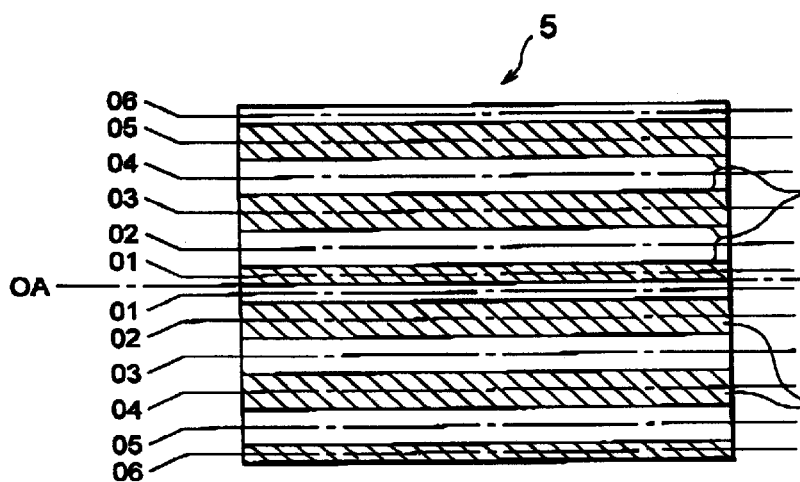
FIG. 16A is a front view showing the partial mirror member used in the projection apparatus according to the embodiment of the present invention.
Figure 16B:
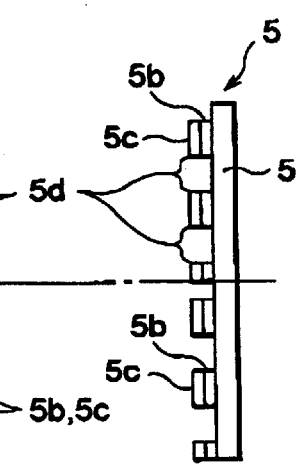
FIG. 16B is a right side view of the partial mirror member used in the projection apparatus according to the embodiment of the present invention.

FIGS. 16A and 16B shows a construction of the partial reflection mirror member 5 disposed close to the exit surface of the second lens plate 3. As described above, the partial reflection mirror member 5 is constructed such that the reflection mirror layer 5b of a band shape laterally extending is disposed on the transparent glass plate 5a and the 1/4 wave plate layer 5c is disposed on the mirror layer 5b.

When the partial reflection mirror member 5 is disposed close to the second lens plate 3, the lateral boundary line between the adjacent lenses 3a on the second lens plate 3 is made so as to be approximately coincident with the central position of the reflection mirror layer 5b of the band shape of the partial reflection mirror member 5.

The reflection mirror layer 5b of the partial reflection mirror member 5 in this embodiment is formed such that the layer 5b has the equal width to that of the mirror layer un-formed portion 5d. It should be noted that the widths of the reflection mirror layers 5b disposed in the third and sixth rows from the above are half those disposed in other rows. The width of the mirror layer un-formed portion 5d disposed between the reflection mirror layers 5b on the third and fourth rows is set to be equal to that of the reflection mirror layer 5b on the third row.

This is because the band portion of the reflection mirror layer 5b is disposed close to the top of the convex portion of the lens 3a when the partial reflection mirror member 5 is disposed close to the second lens plate 3.

The reflection mirror layer 5b and the mirror layer un-formed portion 5d are arranged so that the central position (O1, O2, O3, O4, O5 and O6) of the mirror layer 5b and the central position (O1, O2, O3, O4, O5 and O6) of the portion 5d are disposed symmetrically with respect to the specified straight line (the central line OA).

Figure 17:
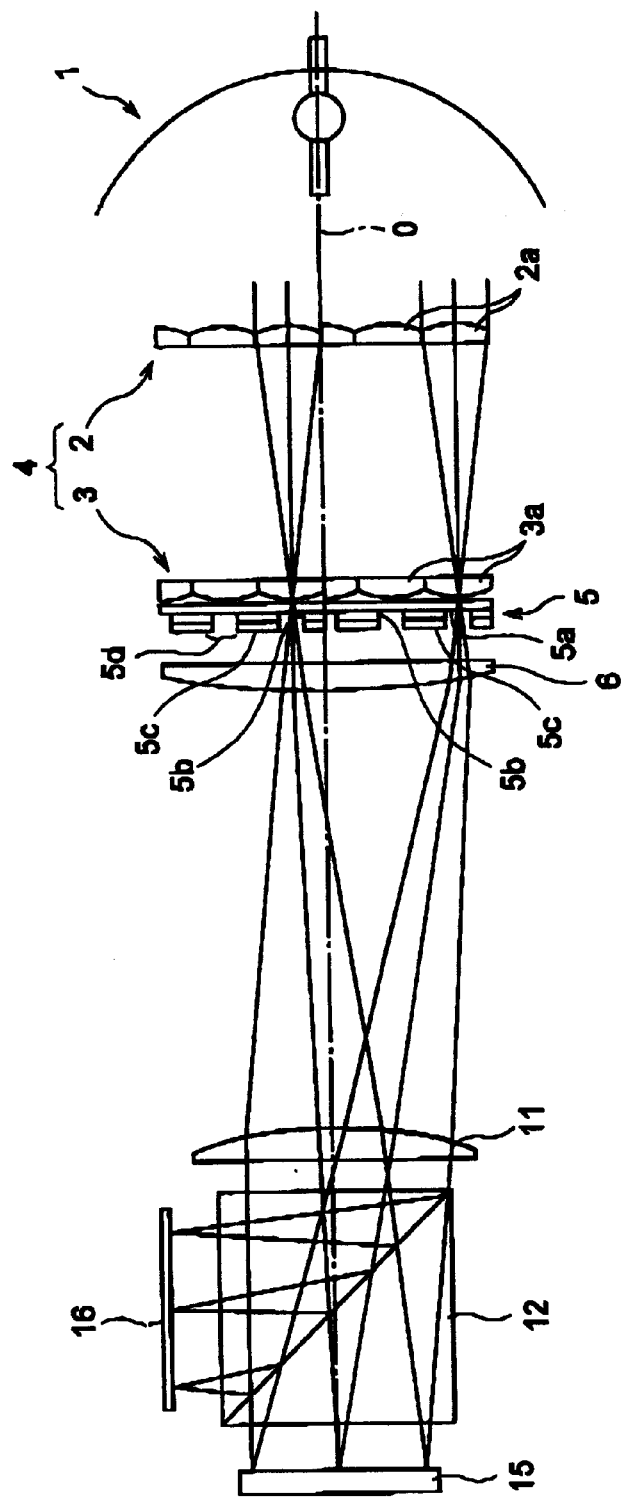
FIG. 17 is a diagram showing behaviors of two beams of light among the beams of light incident onto each of lens of a first lens plate which illuminate a light valve and a reflection mirror in an illumination optical system of the projection apparatus according to the embodiment of the present invention, one of the beam of light passing through a lens disposed at the center position among the lens of the first lens and the others passing through a lens disposed at the outermost position among the lens thereof.

FIG. 17 is an explanatory view showing the state in which an image is formed on the light valve 15 and the reflection mirror 16 by the first and second lens plates 2 and 3 and the field lenses 6 and 11. The illustration for the beams of light of FIG. 17 are made for three beams of light incident onto the apertures of the lenses disposed on the central line O and the lowermost of the first lens plate 2. Two beams of light are incident onto the uppermost portion and lowermost portion of the aperture formed by the lens 2a on the first lens plate 2, and the remaining is incident onto the central portion of the aperture in parallel with the optical axis.

Among the beams of light incident onto each of the apertures of the lenses 2a of the first lens plate 2, the beam of light is incident in parallel with the optical axis and passes through the center of the corresponding aperture, which then passes through the central portion of the corresponding lens 3a of the second lens plate 3 corresponding to the apertures of the lenses 2a of the first lens plate 2. The beam of light passes through the mirror layer un-formed portions 5d of the partial reflection mirror member 5. The beams of light travels in parallel with the optical axis and in parallel with other beams of light which are incident onto the central portion of the aperture, (i.e., keeping its telecentric characteristic). The beams of light are collected to the almost central portion of the light valves 15 and the reflection mirror 16 by the field lenses 6 and 11.

Because the second lens plate 3 is disposed at the focal point position of the lens 2a of the first lens plate 2 as described above, the beam of light incident in parallel with the optical axis onto the upper portion of the aperture of the lens 2a of the first lens plate 2 in FIG. 17 intersects the beam of light passing through the central portion of the aperture on the first lens plate 2 at the center of the lens 3a of the second lens plate 3, and transmits through the mirror layer un-formed portion 5d of the partial reflection mirror section 5, so as to be collected to the lower portion of the light valve 15 and the right portion of the reflection mirror 16 by the field lenses 6 and 11.

Because the second lens plate 3 is disposed at the focal point position of the lens 2a of the first lens plate 2 as described above, the beam of light incident in parallel with the optical axis onto the lower portion of the aperture of the lens 2a of the first lens plate 2 in FIG. 17 intersects the beam of light passing through the central portion of the aperture on the first lens plate 2 at the center of the lens 3a of the second lens plate 3, and transmits through the mirror layer un-formed portion 5d of the partial reflection mirror section 5 that is a transparent portion, so as to be collected to the upper portion of the light valve 15 and the left portion of the reflection mirror 16 by the field lenses 6 and 11.

Here, the illumination onto the light valve 15 by the P polarized light which transmits through the polarization beam splitter 12 is implemented by the illumination onto the reflection mirror 16 by the foregoing reflected S polarized light and by the mirror image relation to the polarization separation section of the polarization beam splitter 12. This is because the light valve 15 and the reflection mirror 16 are disposed at the conjugated position in the illumination optical system.

Next, the illumination optical system in which the light valve 15 is illuminated by the light reflected by the reflection mirror 16 will be described.

Figure 18:
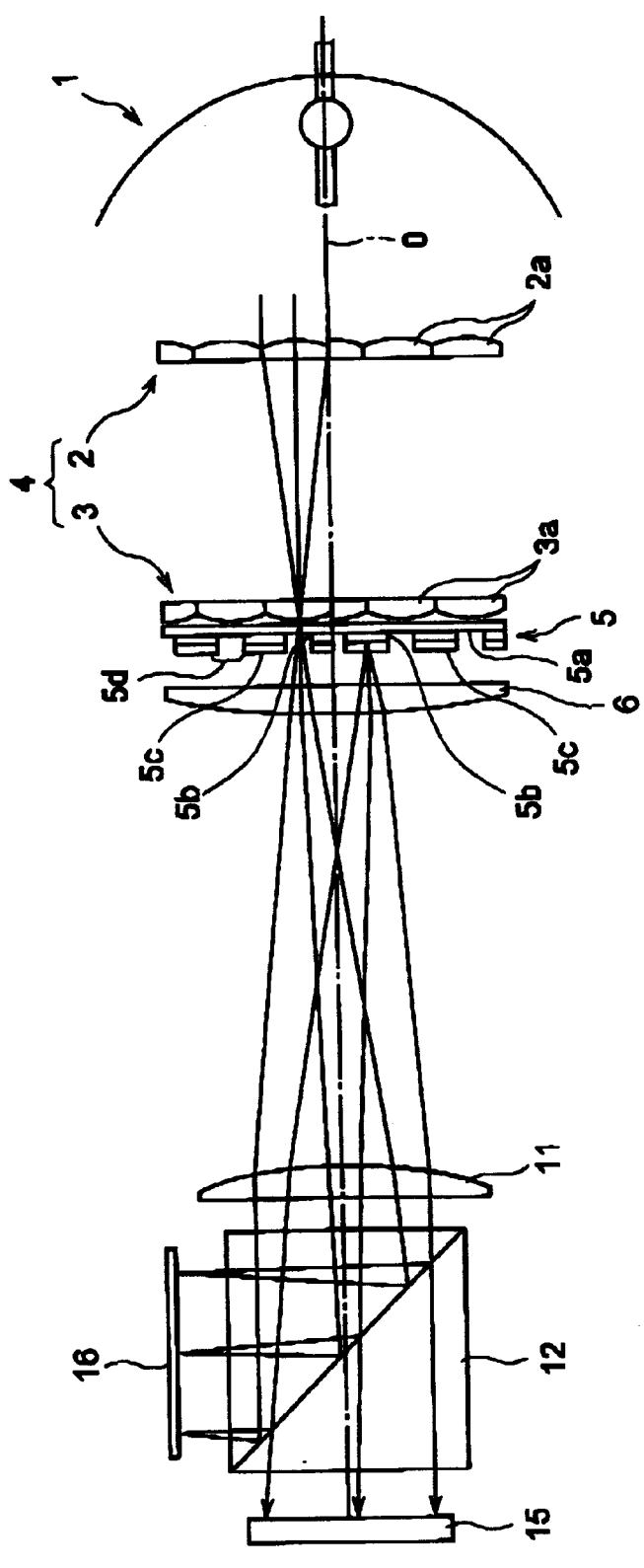
FIG. 18 is a diagram showing behaviors of the illuminations of the three beams of light incident onto a lens disposed at the center line of the first lens plate in the illumination optical system of the projection apparatus according to the embodiment of the present invention, the three beams of light illuminating the light valve after passing through the reflection mirror member and the partial reflection mirror member.

FIG. 18 is an explanatory view showing the state of an incidence of the light onto the reflection mirror 16, which is incident onto the aperture disposed right above the center line O of the first lens plate 2, as well as state of an illumination of the light reflected by the reflection mirror 16 onto the light valve 15.

Similar to FIG. 17, in FIG. 18, three lights are illustrated, two lights being incident onto the outermost portions of the aperture disposed right above the center line O of the first lens plate 2 and remaining one light being incident onto the central portion of this aperture.

The light incident onto the central portion of the aperture of the lens plate 2 in parallel with the optical axis is incident onto the almost central portion of the reflection mirror 16 with a predetermined angle relative to the optical axis and is reflected according to the reflection law as is shown in FIG. 17. This reflection mirror 16 is disposed approximately perpendicular to the optical axis. Therefore, this incidence light reflected by the mirror 16 according to the reflection law is the S polarized light so that this light is incident onto the polarization beam splitter 12 again and is reflected by the polarization separation section of the splitter 12, which then travels keeping the predetermined inclination to the incidence optical axis. The light is changed so as to be in parallel with the optical axis by the field lenses 11 and 6, after transmitting through the field lenses 11 and 6, (i.e., keeping its telecentric characteristic). Thus, the light is incident onto the reflection mirror layer 5b of the partial reflection mirror member 5 through the 1/4 wave plate layer 5c. This reflection mirror layer 5b onto which the light is incident is disposed at the position corresponding to the lower lens 3a of the second lens plate 3, that is, at the position symmetrical with respect to the mirror layer un-formed portion 5d of the partial reflection mirror member 5 interposing center line OA, from which the light exits. The light incident onto the reflection mirror layer 5b keeps its telecentric characteristic, which travels in parallel with the optical axis, so that the light is reflected to the completely opposite direction to the incidence direction. The light passes through the 1/4 wave plate layer 5c again, whereby the light is converted to the P polarized light. The light travels with a predetermined inclination to the optical axis, and then is incident onto the polarization beam splitter 12. Finally, the light transmits through the polarization separation section of the polarization beam splitter 12 to be incident onto the light valve 15.

The lights incident onto the upper portion of the aperture of the lens 2a of the first lens plate 2 in parallel with the optical axis, which is disposed right above the center line O, intersect at the lens 3a of the second lens plate 3 the light which passes through the central portion of the aperture of the first lens plate 2. The incidence lights travel after transmitting through the mirror layer un-formed portion 5d of the partial reflection mirror member 5 and are incident onto the right portion of the reflection mirror 16 through the field lenses 6 and 11 and the polarization beam splitter 12. Then, the lights reflected by the reflection mirror 16 travel with a predetermined inclination to the incidence light to be incident onto the polarization beam splitter 12, and are reflected by the polarization separation section. The lights are collected at the same position as the light which is incident onto the central portion of the aperture to the reflection mirror layer 5b of the partial reflection mirror member 5 with an angle relative to the optical axis after passing through the field lenses 6 and 11. The light reflected by the reflection mirror layer 5b of the partial reflection mirror member 5 is reflected according to the reflection law, and travels to be converted to the P polarized light. The light converted to the P polarized light is incident onto the polarization beam splitter 12 through the field lenses 6 and 11 and then incident onto the upper portion of the light valve 15 with a predetermined angle relative to the optical axis.

Moreover, the lights incident in parallel with the optical axis onto the lower portion of the aperture of the lens 2a of the first lens plate 2 intersect at the lens 3a of the second lens plate 3 the light which passes through the central portion of the aperture of the first lens plate 2. The incidence lights travel after transmitting through the mirror layer un-formed portion 5d of the partial reflection mirror member 5 and are incident onto the left portion of the reflection mirror 16 through the field lenses 6 and 11 and the polarization beam splitter 12. Then, the lights reflected by the reflection mirror 16 travel with a predetermined inclination to the incidence light to be incident onto the polarization beam splitter 12, and are reflected by the polarization separation section. The lights are collected, at the same position as the light which is incident onto the central portion of the aperture, to the reflection mirror layer 5b of the partial reflection mirror member 5 with an angle relative to the optical axis after passing through the field lenses 6 and 11. The light reflected by the reflection mirror layer 5b of the partial reflection mirror member 5 is reflected according to the reflection law, and travels to be converted to the P polarized light. The light converted to the P polarized light is incident onto the polarization beam splitter 12 through the field lenses 6 and 11 and then incident onto the lower portion of the light valve 15 with a predetermined angle relative to the optical axis.

Figure 19:
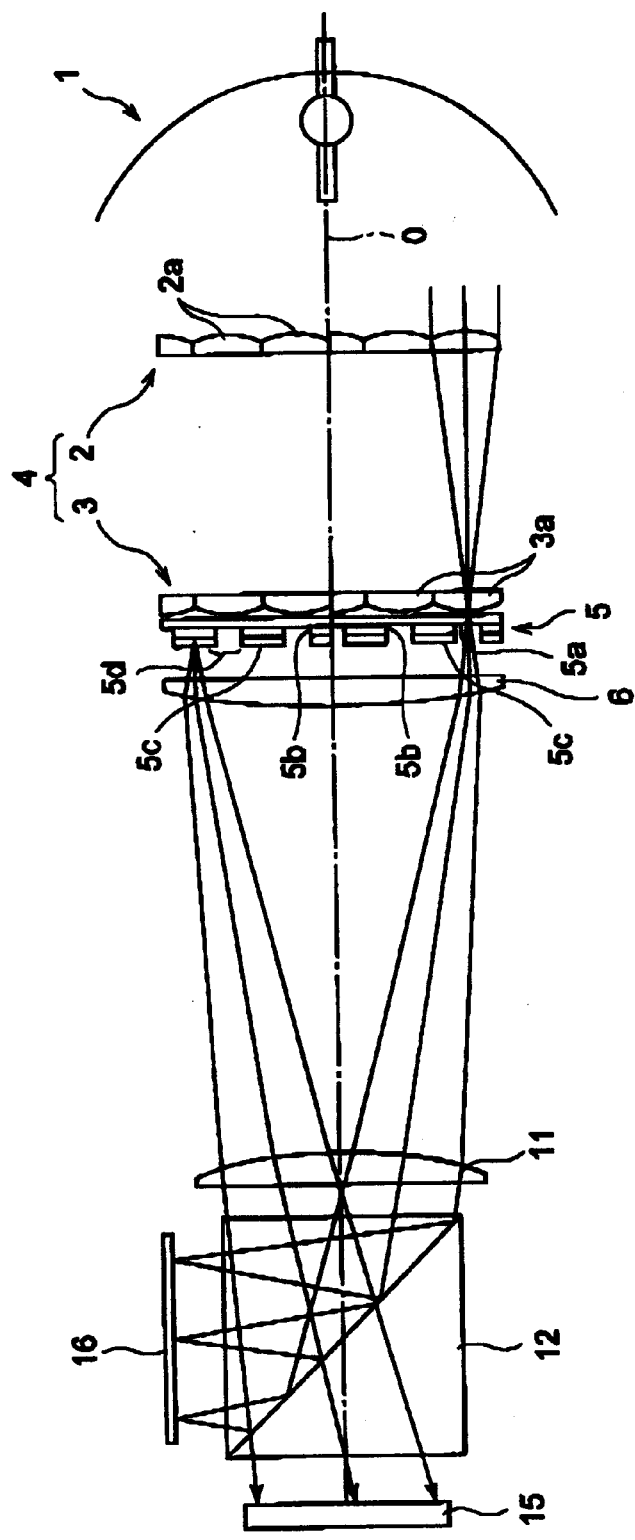
FIG. 19 is a diagram showing behaviors of the illuminations of the three beams of light incident onto a lens disposed at the lowermost position of the first lens plate in the illumination optical system of the projection apparatus according to the embodiment of the present invention, the three beams of light illuminating the light valve after passing through the reflection mirror member and the partial reflection mirror member.

FIG. 19 shows three lights made incident onto the aperture of the first lens plate 2 different from that described above. Specifically, FIG. 17 shows the three light made incident onto the aperture of the first lens plate 2 formed at the lowermost position thereof.

The light incident onto the central portion of the aperture in parallel with the optical axis travels in parallel with the optical axis through the central portion of the lens 3a of the second lens plate 3 which corresponds to the lens 2a, and then is incident onto the almost central portion of the reflection mirror 16 at a predetermined angle thorough the field lenses 6 and 11 and the polarization beam splitter 12. The light reflected by the reflection mirror 16 travels with an angle relative to the optical axis, the angle is larger than that of the light of FIG. 18 relative to the optical axis. The light is reflected to the polarization separation section of the polarization beam splitter 12, and is allowed to be in parallel with the optical axis by the field lenses 11 and 6, (i.e., keeping its telecentric characteristic). The light is incident onto the uppermost reflection mirror layer 5b of the partial reflection mirror member 5 through the 1/4 wave plate layer 5c, the uppermost reflection mirror layer 5b being disposed at the position symmetrical with the mirror layer un-formed portion 5d, through which the light transmits, interposing the center line OA.

The light reflected by the reflection mirror layer 5b keeps its telecentric characteristic. Therefore, it travels in the opposite direction to the incidence light to be converted to the P polarized light and is incident onto the almost central portion of the light valve 15 through the field lenses 6 and 11 and the polarization beam splitter 12 with a larger angle relative to the optical axis compared to FIG. 18.

The lights incident in parallel with the optical axis onto the upper portion of the aperture of the lens 2a of the first lens plate 2 intersect at the lens 3a of the second lens plate 3 the light which passes through the central portion of the aperture of the first lens plate 2. The lights incident onto the aperture of the lens 2a travel after transmitting through the mirror layer un-formed portion 5d of the partial reflection mirror member 5 and are incident onto the right portion of the reflection mirror 16 through the field lenses 6 and 11 and the polarization beam splitter 12 with a larger angle than the incidence angle. Then, the lights reflected by the reflection mirror 16 travel with a large inclination to the incidence light to be incident onto the polarization beam splitter 12, and are reflected by the polarization separation section. The lights are collected at the same position as the light which is incident onto the central portion of the aperture to the reflection mirror layer 5b of the partial reflection mirror member 5 with an angle relative to the optical axis after passing through the field lenses 6 and 11. The light reflected by the reflection mirror layer 5b of the partial reflection mirror member 5 is reflected according to the reflection law, and travels to be converted to the P polarized light. The light converted to the P polarized light is incident onto the polarization beam splitter 12 through the field lenses 6 and 11 and then incident onto the upper portion of the light valve 15 with a predetermined angle relative to the optical axis.

Moreover, the lights incident in parallel with the optical axis onto the lower portion of the aperture of the lens 2a of the first lens plate 2 intersect at the lens 3a of the second lens plate 3 the light which passes through the central portion of the aperture of the first lens plate 2. The incidence lights travel after transmitting through the mirror layer un-formed portion 5d of the partial reflection mirror member 5 and are incident onto the left portion of the reflection mirror 16 with an incidence angle larger than that in FIG. 18 through the field lenses 6 and 11 and the polarization beam splitter 12. Then, the lights reflected by the reflection mirror 16 travel with a predetermined inclination to the incidence light to be incident onto the polarization beam splitter 12, and are reflected by the polarization separation section. The lights are collected, at the same position as the light which is incident onto the central portion of the aperture, to the reflection mirror layer 5b of the partial reflection mirror member 5 with an angle relative to the optical axis after passing through the field lenses 6 and 11. The light reflected by the reflection mirror layer 5b of the partial reflection mirror member 5 is reflected according to the reflection law, and travels to be converted to the P polarized light. The light converted to the P polarized light is incident onto the polarization beam splitter 12 through the field lenses 6 and 11 and then incident onto the lower portion of the light valve 15 with a predetermined angle relative to the optical axis.

In FIG. 19, the light passing through the lowermost aperture of the first lens plate 2 is shown. Concerning the light incident onto the upper aperture, it is understood that the reflection light from the reflection mirror 16 is incident onto the reflection mirror layer 5b right below another mirror layer 5b of the partial reflection mirror member 5 onto which the light of FIG. 7 is incident. As a result, it is understood that the light exited from the lens 2a of the first lens plate 2 is incident onto the reflection mirror layer 5b of the mirror member 5 disposed at the position symmetrical with the light exiting position of the lens 2a interposing the central line OA.

As described above, the reflection mirror 16 is arranged perpendicular to the optical axis. The S polarized light by the polarization beam splitter 12 is reflected by the reflection mirror 16 and reflected again by the polarization separation section of the beam splitter 12 to be incident onto the reflection mirror layer 5b of the partial reflection mirror member 5 through the 1/4 wave plate layer 5c, the member 5 being disposed close to the second lens plate 3. Then, the S polarized light is reflected by the reflection mirror layer 5b, and travels in the opposite direction again to pass through the 1/4 wave plate layer 5c twice, whereby the S polarized light is converted to the P polarized light. Subsequently, the P polarized light transmits through the polarization separation section of the polarization beam splitter 12 to be exited from therefrom and can illuminate the light valve 15.

(Ninth embodiment)

Figure 20:
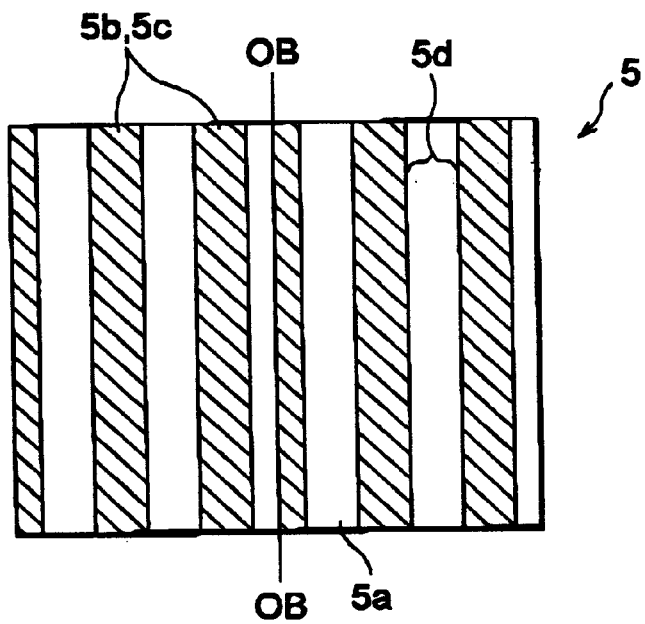
FIG. 20 is a front view showing the partial reflection mirror member used in the projection apparatus according to the embodiment of the present invention.

FIG. 20 shows the partial reflection mirror member 5 used in the projection apparatus according to the ninth embodiment. The projection apparatus of this embodiment differs from that of the eighth embodiment only in the structures of the mirror member 5 and the lenses 2 and 3.

In the projection apparatus of the eighth embodiment, the reflection mirror layer 5b and the 1/4 wave plate 5c of the partial reflection mirror member 5 have a lateral band shape. Compared to this, in the projection apparatus of the ninth embodiment, they have a longitudinal band shape. Similar to the eighth embodiment, the mirror layer un-formed portion 5d and the reflection mirror layer 5b of the partial reflection mirror member 5 are symmetrical each other with respect to the center line OB.

The partial reflection mirror member 5 is disposed close to the second lens plate 3 similar to the projection apparatus of the eighth embodiment. The projection apparatus of this embodiment required to be constituted such that the center of the band of the reflection mirror layer 5b of the member 5 is positioned close to the longitudinal line of the joint portion of the lenses 2a of the first lens plate 2. Specifically, this is because the incidence luminous flux collected to the central portion of the lens 3a of the second lens plate 3 is required to transmit through the mirror layer un-formed portion 5d of the member 5 and the luminous flux is required to be reflected to the direction toward the light source 1 by the reflection mirror layer 5b, thereby preventing the quantity of the light illuminating onto the light valve 15 from being reduced.

Figure 21:
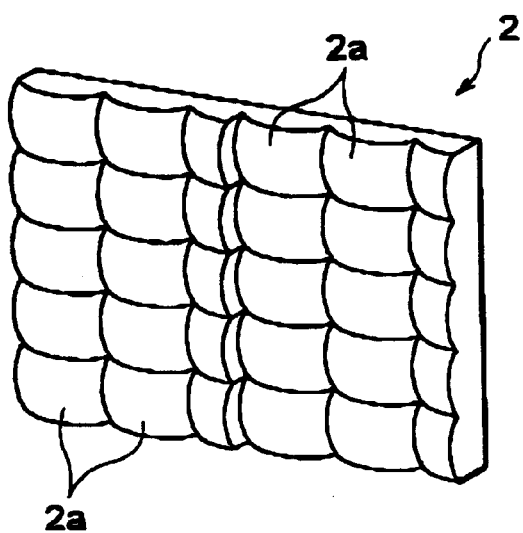
FIG. 21 is a perspective view of the first lens plate of the projection apparatus according to the embodiment of the present invention.

FIG. 21 shows a shape of the first lens plate 2. As shown in FIG. 21, the first lens plate 2 is constituted such that a plurality of convex lenses 2a are arranged on its surface by 6×5 species, that is, 6 in row direction and 5 in column direction (in the first embodiment, 5×6 species), and its opposite surface to that where the lenses 2a are arranged is plane.

The lenses 2a disposed on the first longitudinal line as well as on the fourth longitudinal line from the right end have a shape obtained by cutting their right half and have a size half that of other lenses 2a.

Moreover, the second lens plate 3 has approximately the same shape as the of the first lens plate 2 of FIG. 21. The arrangement of the lenses 3a composed of a convex lens is the same as that of the first lens plate 2. The lenses 3a are arranged by 6×5 species. It should be noted that the shape of the lens 2a of the first lens plate 2 is different from that of the lens 3a of the second lens plate 3.

(Tenth Embodiment)

Figure 22:
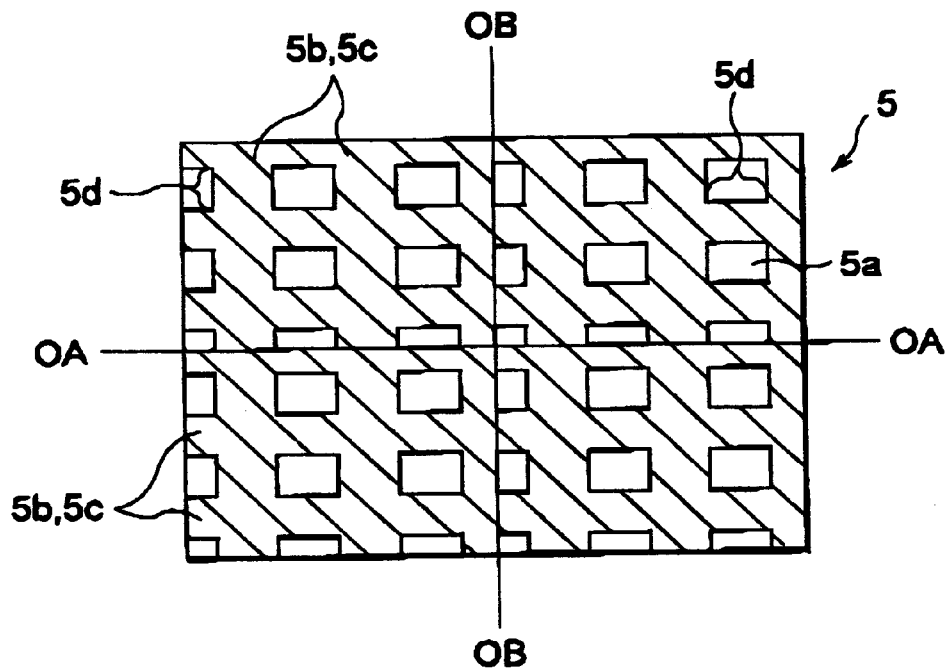
FIG. 22 is a front view of the partial reflection mirror member used in the projection apparatus according to embodiment of the present invention.

FIG. 22 shows the partial reflection mirror member 5 used in the projection apparatus of the tenth embodiment. The projection apparatus of this embodiment differs from that of the eighth embodiment only in the constitutions of the mirror member 5 and the lenses 2 and 3.

In the projection apparatus of the eighth embodiment, the reflection mirror layer 5b and the 1/4 wave plate 5c of the partial reflection mirror member 5 have a lateral band shape. In the projection apparatus of the tenth embodiment, the reflection mirror layer 5b and the 1/4 wave plate 5c of the mirror member 5 have a lattice shape, compared to the lateral and longitudinal band shapes of them of the eighth and ninth embodiments.

In the partial reflection mirror member 5 of this embodiment, the reflection mirror layer 5b is in symmetrical relation to the mirror layer un-formed portion 5d interposing the center line OA extending to the lateral direction. At the same time, they are in symmetrical relation also to the center line OB extending to the longitudinal direction. As a matter of course, the 1/4 wave plate layer 5c is formed on the reflection mirror layer 5b.

The partial reflection mirror member 5 is disposed close to the second lens plate 3 similar to the projection apparatus of the eighth embodiment. The projection apparatus of this embodiment should be constituted such that the lattice of the reflection mirror layer 5b is disposed close to the lateral and longitudinal lines formed by the joint portions of the lenses 3a of the second lens plate 3.

Figure 23:
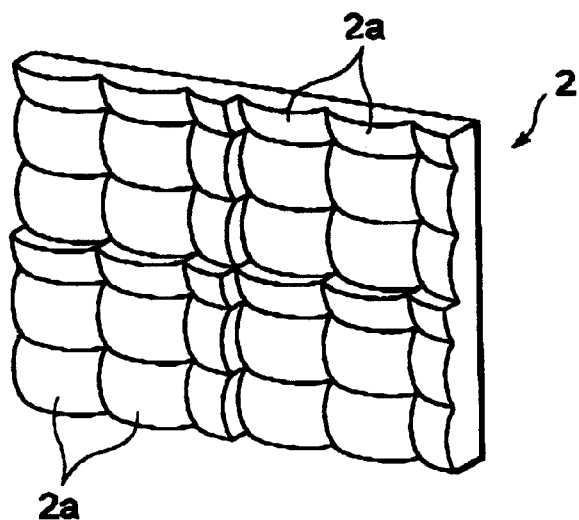
FIG. 23 is a perspective view of the first lens plate of the projection apparatus according to the embodiment of the present invention.

Moreover, in FIG. 23, the shape of the first lens plate 2 of this embodiment is shown. As shown in FIG. 23, on the surface of the first lens plate 2, the lenses 2a of a convex shape are arranged by 6×6 species in row and column directions, respectively. In the first embodiment, the lenses 2a of 5×6 species are arranged in row and column directions and in the second embodiment, the lenses 2a of 6×5 species are arranged in row and column directions. Another surface opposite to the surface where the lenses 2a are arranged is plane.

The lenses 2a disposed at the lateral first line and the lateral fourth line from the uppermost end are cut in each of their upper halves.

Moreover, the lenses 2a disposed at the longitudinal first line and the longitudinal fourth line from the right end are cut in each of their right halves.

The second lens plate 3 has approximately the same shape as that of the first lens plate 2 of FIG. 23. The arrangement of the lenses 3a composed of a convex lens is the same as that of the first lens plate 2, in which and the lenses 3a of 6×5 species are arranged in row and column.

With such constitution, the light source luminous flux transmitting through the mirror layer un-formed portion 5d of the partial reflection mirror member 5 is incident onto the polarization beam splitter 12 as described in the second embodiment. The S polarized light reflected by the polarization separation section is reflected by the reflection mirror 16, which is then reflected by the polarization separation section of the polarization beam splitter 12 again. The reflected S polarized light is incident onto the corresponding reflection mirror layer 5b of the partial reflection mirror member 5 according to the present invention and passes through the 1/4 wave plate layer 5c again, whereby the S polarized light is converted to the P polarized light and transmits through the polarization beam splitter 12. The illumination is achieved by superposing on the P polarized light illumination.

In the eighth and ninth embodiments, the illumination optical system is provided, in which the partial reflection mirror member 5 is disposed close to the exiting surface of the second lens plate 3. The partial reflection mirror member 6 may be disposed close to the incidence surface of the second lens plate 3.

(Eleventh Embodiment)

Figure 24:
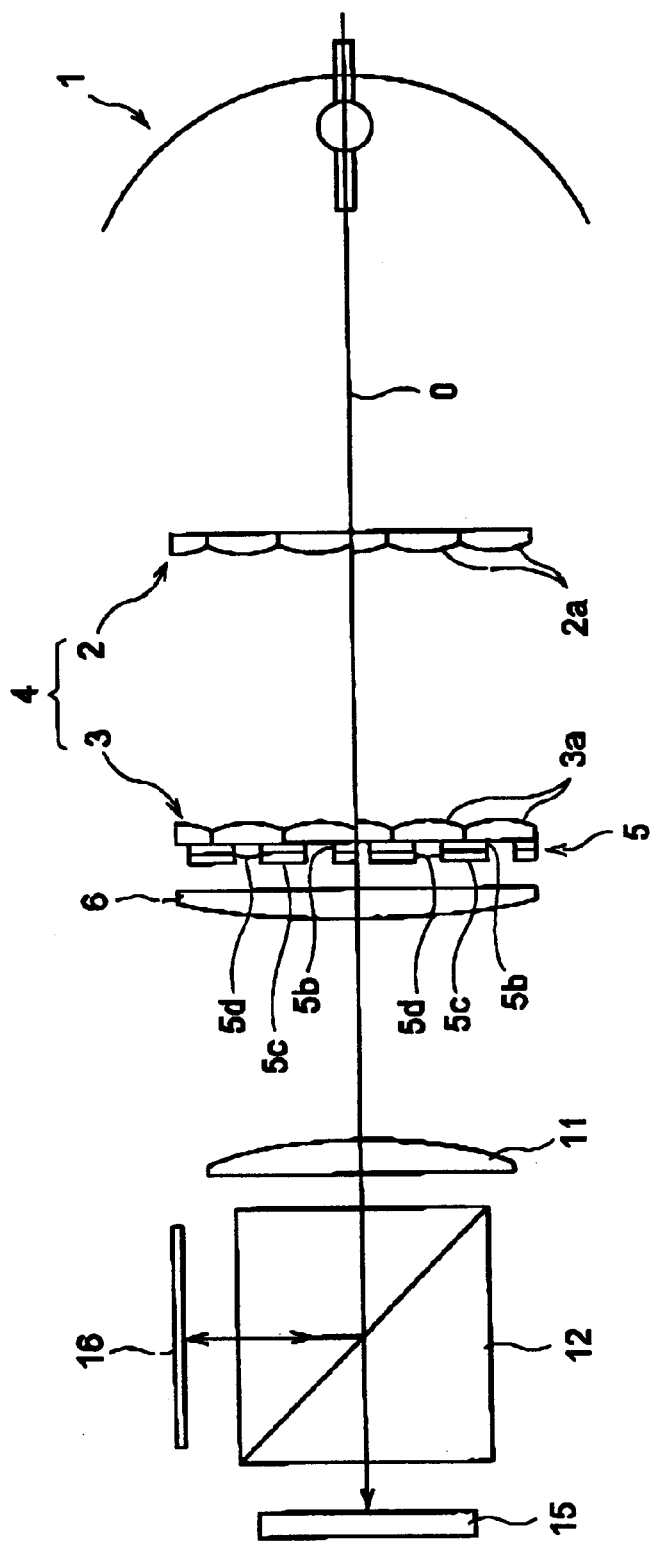
FIG. 24 is a schematic view showing the illumination optical system for the light valve of the projection apparatus according to the embodiment of the present invention.

FIG. 24 shows the projection apparatus of the eleventh embodiment. It should be noted that FIG. 24 shows the constitution of only the path for monochromatic light. The projection apparatus of this embodiment differs from that of the eighth embodiment only in the constitutions of the mirror member 5 and the lenses 2 and 3.

The constitutions of the lenses 2a and 3a of the first and second lenses 2 and 3 are the same as that of the first embodiment, in which the lenses 2 and 3 are disposed so that the lenses 2a and 3a face each other.

In the eighth to tenth embodiments, the partial reflection mirror member 5 is independently provided, which has functions to collect the light reflected from the reflection plate 16 as well as to reflect it again is disposed independently. In this embodiment, the component corresponding to the partial reflection mirror member 5 is formed in the second lens plate 3.

Figure 25:
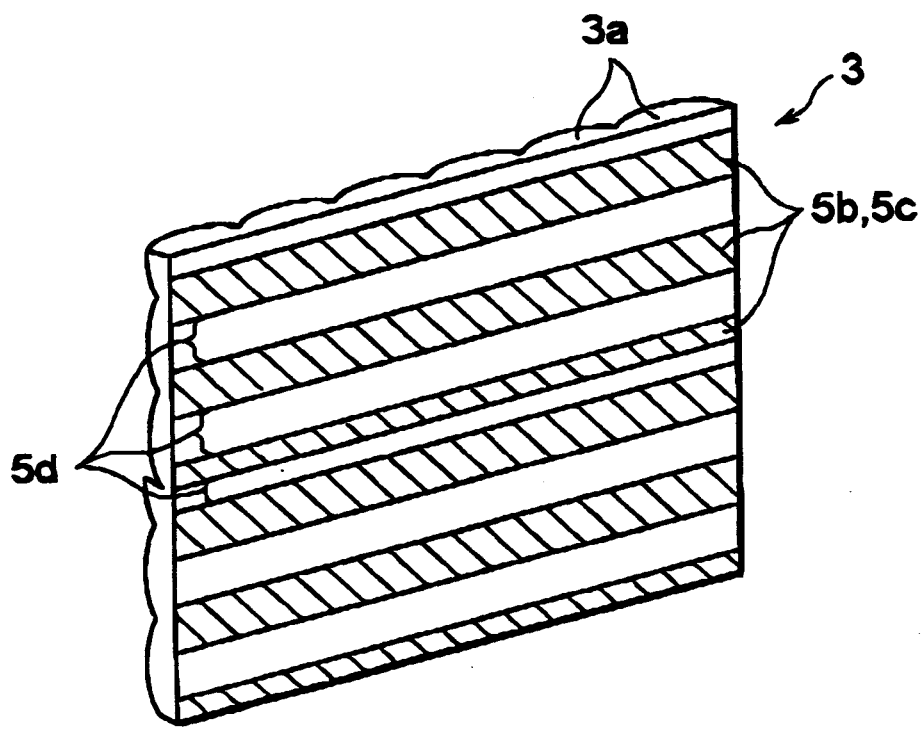
FIG. 25 is a perspective view of the second lens plate of the projection apparatus according to the embodiment of the present invention, in which a reflection mirror layer is provided.

FIG. 25 is a perspective view of the second lens plate 3. Specifically, the reflection mirror layer 5b and the 1/4 wave plate layer 5c in the shape of a lateral band are formed on the plane portion opposite to the formation side of the second lens plate 3 as well as at the positions corresponding to the boundary portion of the lenses 3a on the second lens plate 3 as shown in FIGS. 12 and 13. The shape of them is not limited to this, and the shape of them may be a band shape in which each band is longitudinally parallel as shown in the ninth embodiment. Or, the shape of them may be a lattice as the tenth embodiment. Specifically, the shape of the reflection mirror layer 5b is determined depending on the shape of the lenses 2a and 3a of the first and second lens plates 2 and 3.

The light source light emitted from the light source 1 is converted to approximately the parallel luminous flux by a shaping optical system (not shown) and passes through the lens 2a of the first lens plate 2. The luminous flux is incident onto the lens 3a of the second lens plate 3, which is disposed at a focal distance of the lens 2a as well as the position corresponding to each lens 2a. The, the luminous flux passes through the mirror layer un-formed portion 5d, and passes through the field lens 6 and 11 in the form of the light parallel to the optical axis, which is subjected to the polarized separation by the polarization beam splitter 12 to pass therethrough as the P polarized light. The P polarized light illuminates light valves 15. The S polarized light reflected by this polarization separation section is incident onto the reflection mirror 16 to be reflected by the mirror 16. Thus, the S polarized light is incident onto the polarization beam splitter 12 again to be reflected by the polarization separation section and is exited therefrom. The S polarized light travels through the field lenses 11 and 6 to be made in parallel with the optical axis, that is, (i.e., keeping its telecentric characteristic), and is incident onto the reflection mirror layer 5b of the second lens plate 3. This light reflected by the reflection mirror layer 5b keeps its telecentric characteristic until it reaches to the field lens 6. Specifically, the light travels in opposite direction to the incidence light and is allowed to be incident onto the polarization beam splitter 12 again. Then, the light transmits through the polarization beam splitter 12 to illuminate the light valve 15.

With such construction, similar to the first embodiment, the S polarized light which has been discarded is converted to the P polarized light which passes through the polarization beam splitter 12, whereby the light valve 15 can be illuminated and the quantity of light to illuminate the light valve 15 can be significantly increased. Therefore, a high luminance image can be obtained as a projection image.

Moreover, as this embodiment, if the reflection mirror layer 5b and the 1/4 wave plate layer 5c are provided in the second lens plate 3, it is unnecessary to provide the reflection mirror member 5 as in the eighth embodiment, thereby reducing the number of the parts.

In each of the embodiments of the present invention, the projection apparatus is constituted such that the transmission light among the colors produced by the three color decomposition optical system is allowed to be incident onto the light valve, each of the colors being incident onto the corresponding polarization beam splitter, and the polarized light to be reflected is introduced to the reflection mirror to be reflected. As a matter of course, the constitution may be adopted, in which the reflection mirror is disposed at the position where each of the light reflected from the polarization beam splitter is first introduced to the light valve and the light transmits therethrough.

The 1/4 wave plates 5c provided on the reflection mirror layer 5b may be cut to the same shape and may be adhered to the reflection mirror layer 5b of a predetermined shape. However, the 1/4 wave plate layer 5c may be formed by a slant evaporation method. In this case, the reflection mirror layer 5b may be formed in such manner that aluminum or the like is formed to a predetermined shape by a mask evaporation and titanium dioxide ($TiO_2$) layer or the like is formed thereon to a predetermined thickness by an evaporation method. As long as the evaporation mask is prepared, the 1/4 wave plate 5c can be formed on the reflection mirror layer with a high precision. Even in the case of the present invention, it is needless to say that the phase advance axis as the 1/4 wave plate can be manufactured in a predetermined direction when the inclination direction of the substrate during formation of the film is controlled.

As described above, according to the projection apparatus of the present invention, the second polarized light which has been discarded is converted to the first polarized light to be incident onto the light valve, whereby the first polarized light can contribute to the illumination. The second polarized light is superimposed onto the first polarized light which is naturally the light source light which is incident onto the polarization separation means and passes this means and illuminate the light valve, whereby a high luminance illumination can be achieved and the high luminance projection image can be provided in spite of the use of the light source that is the same as the conventional one. Moreover, in the present invention, the projection apparatus adopts the constitution in which the so called fly-eye integrator using the first and second lens plates is employed. Therefore, the luminous flux separated by the individual apertures of the lens of the first lens plate is superimposed on the light valve by the lens of the second lens plate so that the uniform illumination can be achieved.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. An illumination optical system which illuminates a light emitted from a light source onto a light valve;
- a polarization beam splitter which is disposed in a path of the light between said light source and said light valve so that one of a polarized light component of incidence lights is illuminated onto said light valve;
- a reflection mirror which reflects the other polarized component of the incidence lights toward the said polarization beam splitter;
- a reflection mirror layer disposed in the path of the light between said light source and said light valve so as to reflect the light from said polarization beam splitter; and
- a wave plate disposed between a path of the light between said reflection mirror layer and said polarization beam splitter;
- wherein said reflection mirror layer is disposed in the form of stripe.

2. A projection apparatus comprising:
the illumination optical system recited in claim 1; and
a projection optical system for projecting the light exited from said light valve.

3. An illumination optical system which illuminates a light emitted frog a light source onto a light valve;
- a polarization beam splitter which is disposed in a path of the light between said light source and said light valve so that one of a polarized light component of incidence lights is illuminated onto said light valve;
- a reflection mirror which reflects the other polarized component of the incidence lights toward the said polarization beam splitter;
- a reflection mirror layer disposed in the path of the light between said light source and said light valve so as to reflect the light from said polarization beam splitter; and
- a wave plate disposed between a path of the light between said reflection mirror layer and said polarization beam splitter;
- wherein said reflection mirror layer is disposed in the form of lattice.

4. A projection apparatus comprising:
the illumination optical system recited in claim 3; and
a projection optical system for projecting the light exited from said light valve.

5. An illumination optical system which illuminates a light emitted from a light source onto a light valve;
- a polarization beam splitter which is disposed in a path of the light between said light source and said light valve so that one of a polarized light component of incidence lights is illuminated onto said light valve;
- a reflection mirror which reflects the other polarized component of the incidence lights toward the said polarization beam splitter;
- a reflection mirror layer disposed in the path of the light between said light source and said light valve so as to reflect the light from said polarization beam splitter; and
- a wave plate disposed between a path of the light between said reflection mirror layer and said polarization beam splitter;
- wherein a fly-eye integrator is provided between said light source and said reflection mirror layer, and said reflection mirror layer is provided on a light exit surface of said fly-eye integrator; and
- wherein said fly-eye integrator comprises first and second lens plates disposed so as to face each other, and each of said first and second lens plates has a plurality of micro lenses, each being disposed asymmetrical with respect to a center line perpendicular to a surface normal of the first and second lens plates.

6. A projection apparatus comprising:
the illumination optical system recited in claim 4; and
a projection optical system for projecting the light exited from said light valve.

7. An illumination optical system which illumninates a light emitted from a light source onto a light valve;
- a polarization beam splitter which is disposed in a path of the light between said light source and said light valve so that one of a polarized light component of incidence lights is illuminated onto said light valve;
- a reflection mirror which reflects the other polarized component of the incidence lights toward the said polarization beam splitter;
- a reflection mirror layer disposed in the path of the light between said light source and said light valve so as to reflect the light from said polarization beam splitter; and
- a wave plate disposed between a path of the light between said reflection mirror layer and said polarization beam splitter;
- wherein a fly-eye integrator is provided between said light source and said reflection mirror layer, and said reflection mirror layer is provided near a light exit surface of said fly-eye integrator; and
- wherein said fly-eye integrator comprises first and second lens plates disposed so as to face each other, and each of said first and second lens plates has a plurality of micro lenses, each being disposed asymmetrical with respect to a center line perpendicular to a surface normal of the first and second lens plates.

8. An illumination optical system which illuminates a light valve with light emitted from a light source;
- a fly-eye integrator which is disposed in a light path between said light source and said light valve, said fly-eye integrator having first and second fly-eye lens plates, said first fly-eye lens plate being arranged closer to said light source than said second fly-eye lens plate;
- a polarization beam splitter which is disposed in a light path between said fly-eye integrator and said light valve so that said light valve is illuminated with light having one polarized light component via said polarization beam splitter;
- a reflection mirror which reflects the other polarized light component that has illuminated said polarization beam splitter back to said polarization beam splitter;
- a reflection mirror layer disposed on or near said second fly-eye lens plate so as to reflect the light that has come from said reflection mirror via said polarization beam splitter back to said polarization beam splitter; and
- a wave plate disposed in the light path between said reflection mirror layer and said polarization beam splitter.

* * * * *

UNITED STATES PATENT AND TRADEMARK OFFICE
CERTIFICATE OF CORRECTION

PATENT NO. : 6,028,703
DATED : February 22, 2000
INVENTOR(S) : Atsushi SEKINE, et al..

It is certified that error appears in the above-identified patent and that said Letters Patent is hereby corrected as shown below:

Claim 3, Line 2, "frog" should read - - from - -.

Signed and Sealed this

Third Day of April, 2001

Attest:

NICHOLAS P. GODICI

*Attesting Officer*   Acting Director of the United States Patent and Trademark Office